(12) United States Patent
Ramasubramonian et al.

(10) Patent No.: US 10,321,162 B2
(45) Date of Patent: Jun. 11, 2019

(54) DERIVATION OF COLOR GAMUT SCALABILITY PARAMETERS AND TABLES IN SCALABLE VIDEO CODING

(71) Applicant: QUALCOMM Incorporated, San Diego, CA (US)

(72) Inventors: Adarsh Krishnan Ramasubramonian, San Diego, CA (US); Xiang Li, San Diego, CA (US); Joel Sole Rojals, San Diego, CA (US); Marta Karczewicz, San Diego, CA (US); Sungwon Lee, San Diego, CA (US); Dmytro Rusanovskyy, San Diego, CA (US); Done Bugdayci Sansli, Tampere (FI)

(73) Assignee: Qualcomm Incorporated, San Diego, CA (US)

( * ) Notice: Subject to any disclaimer, the term of this patent is extended or adjusted under 35 U.S.C. 154(b) by 413 days.

(21) Appl. No.: 15/175,944

(22) Filed: Jun. 7, 2016

(65) Prior Publication Data

US 2016/0360235 A1     Dec. 8, 2016

Related U.S. Application Data

(60) Provisional application No. 62/172,779, filed on Jun. 8, 2015.

(51) Int. Cl.
*H04N 19/00* (2014.01)
*H04N 19/86* (2014.01)
(Continued)

(52) U.S. Cl.
CPC .......... *H04N 19/86* (2014.11); *H04N 19/103* (2014.11); *H04N 19/105* (2014.11);
(Continued)

(58) Field of Classification Search
CPC ....................................................... H04N 19/00
See application file for complete search history.

(56) References Cited

U.S. PATENT DOCUMENTS

| 2015/0103902 A1 | 4/2015 | Li et al. | |
| 2016/0165243 A1* | 6/2016 | Nakagami | H04N 19/34 375/240.08 |

OTHER PUBLICATIONS

International Search Report and Written Opinion of International Application No. PCT/US2016/036448, dated Aug. 3, 2016, 13 pp.
(Continued)

*Primary Examiner* — Maryam A Nasri
(74) *Attorney, Agent, or Firm* — Shumaker & Sieffert, P.A.

(57) ABSTRACT

Techniques are described for identifying and reducing the incidence of artifacts in video using color gamut scalability (CGS) parameters and tables in scalable video coding (SVC). Derivation of CGS mapping tables are performed for each partition of pixel values in a color space. The pixel value domain is split into partitions and each is optimized independently. Color prediction techniques for CGS may be used by video encoders and/or video decoders to generate inter-layer reference pictures when a color gamut for a lower layer of video data is different than a color gamut for a higher layer of the video data. When mapped values are used as inter-layer predication references for the enhancement layer blocks, artifacts may appear in some frames of the sequences. A video encoder may identify blocks that potentially contain these artifacts and disable inter-layer prediction in those identified blocks.

19 Claims, 19 Drawing Sheets

(51) Int. Cl.
| | |
|---|---|
| *H04N 19/187* | (2014.01) |
| *H04N 19/615* | (2014.01) |
| *H04N 19/147* | (2014.01) |
| *H04N 19/119* | (2014.01) |
| *H04N 19/587* | (2014.01) |
| *H04N 19/105* | (2014.01) |
| *H04N 19/96* | (2014.01) |
| *H04N 19/13* | (2014.01) |
| *H04N 19/50* | (2014.01) |
| *H04N 19/176* | (2014.01) |
| *H04N 19/30* | (2014.01) |
| *H04N 19/103* | (2014.01) |
| *H04N 19/186* | (2014.01) |
| *H04N 19/36* | (2014.01) |

(52) U.S. Cl.
CPC .......... *H04N 19/119* (2014.11); *H04N 19/13* (2014.11); *H04N 19/147* (2014.11); *H04N 19/176* (2014.11); *H04N 19/186* (2014.11); *H04N 19/187* (2014.11); *H04N 19/30* (2014.11); *H04N 19/36* (2014.11); *H04N 19/50* (2014.11); *H04N 19/587* (2014.11); *H04N 19/615* (2014.11); *H04N 19/96* (2014.11)

(56) References Cited

OTHER PUBLICATIONS

Li et al., "Non-SCE1: Improved CGS Partitioning on Top of SHM-6", Joint Collaborative Team on Video Coding (JCT-VC) of ITU-T SG 16 WP 3 and ISO/IEC JTC 1, Jul. 1, 2014, Retrieved from the Internet on Jul. 25, 2016: http://phenix.int-evry.fr/jct/doc_end_user/current_document.php?id=922, 4 pp.

Luthra et al., "Call for Evidence (CfE) for HDR and WCG Video Coding", MPEG document M36131, ISO/IEC JTC1/SC29/WG11 MPEG2014/N15083, Switzerland, Feb. 2015, 46 pp.

Ramasubramonian et al., "Dual Layer Non-Normative (Category 3b) Response to the Call for Evidence on HDR/WCG", MPEG Meeting; Jun. 22-26, 2015; Warsaw; (Motion Picture Expert Group or ISO/IEC JTC1/SC29/WG11 ), No. m36280, Jun. 21, 2015, 4 pp.

"High Dynamic Range Electro-Optical Transfer Function of Mastering Reference Displays," SMPTE ST 2084:2014; SMPTE Standar; Aug. 16, 2014, 14 pp.

Kerofsky et al., "Color Gamut Scalable Video Coding: New Results," Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, JCTVC-L0334, Retrieved Feb. 17, 2017, 18 pp.

Boyce et al., "Draft high efficiency video coding (HEVC) version 2, combined format range extensions (RExt), scalability (SHVC), and multi-view (MV-HEVC) extensions," Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, ISO/IEC 23008-2:201x(E), JCTVC-R1013_v6, 541 pp.

Tech et al., "3D-HEVC Draft Text 7," Joint Collaborative Team on Video Coding (JCT-VC) of ITU-T SG 16 WP 3 and ISO/IEC JTC 1/SC 29/WG 11, 11th Meeting: Geneva, CH, Feb. 12-18, 2015, JCT3V-K1001-v9, 101 pp.

CIE 15: Technical Report: Colorimetry, 3rd edition, 10 CFR 430 Subpart B, App. R, 4.1.1, International Commission on Illumination, Commission Internationale De L'eclairage International Commission on Illumination Internationale Beleuchtungskomission, ISBN 3 901 906 33 9, Vienna, 82 pages, 2004.

"Parameter values for the HDTV standards for production and international programme exchange," Recommendation ITU-R BT.709-6, ITU-R Radiocommunication Section of ITU, Geneva, Jun. 2015, 19 pp.

"Parameter values for ultra-high definition television systems for production and international programme exchange," Recommendation ITU-R BT.2020-2, ITU-R Radiocommunication Section of ITU, Geneva, Oct. 2015, 8 pp.

ITU-T H.261, Line Transmission of Non-Telephone Signals, Video Codec for Audiovisual Services At px64 kbits, The International Telecommunication Union, Mar. 1993, 32 pp.

ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 211 pp.

ITU-T H.263, Series H: Audiovisual and Multimedia Systems, Infrastructure of audiovisual services—Coding of moving video, Video coding for low bit rate communication, The International Telecommunication Union, Jan. 2005, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

"Camera Aperture Image and Usage" SMPTE Standard for Motion-Picture Film (8-mm Type R), SMPTE-231-2004, Society of Motion Picture and Television Engineers, Nov. 8, 2004, 4pp.

Luthra A., et al., "New Draft CfE for HDR and WCG Video Coding," 111, MPEG Meeting; Feb. 6, 2015-Feb. 20, 2015; Geneva, CH (Motion Picture Expert Group or ISO/IEC JTC1/SC29/WG11), No. m36131, Feb. 20, 2015 (Feb. 20, 2015), XP030064499, 47 pp.

* cited by examiner

DERIVATION OF COLOR GAMUT SCALABILITY PARAMETERS AND TABLES IN SCALABLE VIDEO CODING

RELATED APPLICATIONS

This application claims the benefit of U.S. Provisional Application No. 62/172,779, filed Jun. 8, 2015, the entire content of which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for identifying and reducing the incidence of artifacts in video using color gamut scalability (CGS) parameters and tables in scalable video coding (SVC). Derivation of CGS mapping tables may be performed for each partition of pixel values in a color space (e.g., a YUV domain). The pixel color domain (i.e., a three dimensional (3D) domain of YUV or XYZ tristimulus values that specify a specific color given a specific color container) is split into rectangular cuboids and CGS parameters are obtained by optimizing each rectangular cuboid. Each cuboid is optimized independently. Two pixel values that belong to two adjacent cuboids and have a small value difference may have a difference in the mapped values in the CGS mapping tables for the two pixel values that is large. Color prediction techniques for CGS may be used by video encoders and/or video decoders to generate inter-layer reference pictures when a color gamut or dynamic range for a lower layer of video data is different than a color gamut or dynamic range for a higher layer of the video data. When mapped values are used as inter-layer prediction references for the enhancement layer blocks, artifacts may appear in some frames of the sequences. According to the techniques described in this disclosure, a video encoder may identify blocks that may potentially contain these artifacts and disable inter-layer prediction in those identified blocks.

In one example, this disclosure is directed toward a method of encoding video data. The method comprises receiving video data comprising a plurality of video blocks, the plurality of video blocks comprising a plurality of pixel values in a color space, obtaining color gamut scalability (CGS) parameters comprising splitting the color space into a plurality of rectangular cuboid partitions, each of the plurality of rectangular cuboid partitions comprising at least one partition boundary between the plurality of rectangular cuboid partitions, identifying pixel values in the rectangular cuboid partitions that comprise characteristics that may cause the obtained CGS parameters to produce artifacts when decoding the plurality of video blocks, identifying blocks of the plurality of video blocks that contain the pixel values that may cause the obtained CGS parameters to produce artifacts when decoding the plurality of video blocks, disabling an inter-layer prediction mode for the identified blocks, and encoding the plurality of video blocks using a scalable video coding process with the obtained CGS parameters.

In another example, this disclosure describes a device for processing data, the device comprising: a memory configured to store video data, and one or more processors in communication with the memory and configured to: receive the video data comprising a plurality of video blocks, the plurality of video blocks comprising a plurality of pixel values in a color space, obtain color gamut scalability (CGS) parameters via a split of the color space into a plurality of rectangular cuboid partitions, each of the plurality of rectangular cuboid partitions comprising at least one partition boundary between the plurality of rectangular cuboid partitions, identify pixel values in the rectangular cuboid partitions that comprise characteristics that may cause the obtained CGS parameters to produce artifacts when decoding the plurality of video blocks, identify blocks of the plurality of video blocks that contain the pixel values that may cause the obtained CGS parameters to produce artifacts when decoding the plurality of video blocks, disable an inter-layer prediction mode for the identified blocks, and encode the plurality of video blocks using a scalable video coding process with the obtained CGS parameters.

In another example, this disclosure describes a device for encoding video data, the device comprising: means for receiving video data comprising a plurality of video blocks, the plurality of video blocks comprising a plurality of pixel values in a color space, means for obtaining color gamut scalability (CGS) parameters comprising splitting the color space into a plurality of rectangular cuboid partitions, each of the plurality of rectangular cuboid partitions comprising at least one partition boundary between the plurality of rectangular cuboid partitions, means for identifying pixel values in the rectangular cuboid partitions that comprise characteristics that may cause the obtained CGS parameters to produce artifacts when decoding the plurality of video blocks, means for identifying blocks of the plurality of video blocks that contain the pixel values that may cause the obtained CGS parameters to produce artifacts when decoding the plurality of video blocks, means for disabling an inter-layer prediction mode for the identified blocks, and means for encoding the plurality of video blocks using a scalable video coding process with the obtained CGS parameters.

In another example, this disclosure describes a non-transitory computer-readable storage medium including instructions stored thereon that, when executed, cause at least one processor of to: receive video data comprising a plurality of video blocks, the plurality of video blocks comprising a plurality of pixel values in a color space, obtain color gamut scalability (CGS) parameters via a split of the color space into a plurality of rectangular cuboid partitions, each of the plurality of rectangular cuboid partitions comprising at least one partition boundary between the plurality of rectangular cuboid partitions, identify pixel values in the rectangular cuboid partitions that comprise characteristics that may cause the obtained CGS parameters to produce artifacts when decoding the plurality of video blocks, identify blocks of the plurality of video blocks that contain the pixel values that may cause the obtained CGS parameters to produce artifacts when decoding the plurality of video blocks, disable an inter-layer prediction mode for the identified blocks, and encode the plurality of video blocks using a scalable video coding process with the obtained CGS parameters.

The details of one or more examples are set forth in the accompanying drawings and the description below. Other features, objects, and advantages will be apparent from the description and drawings, and from the claims.

DETAILED DESCRIPTION

Figure 1:
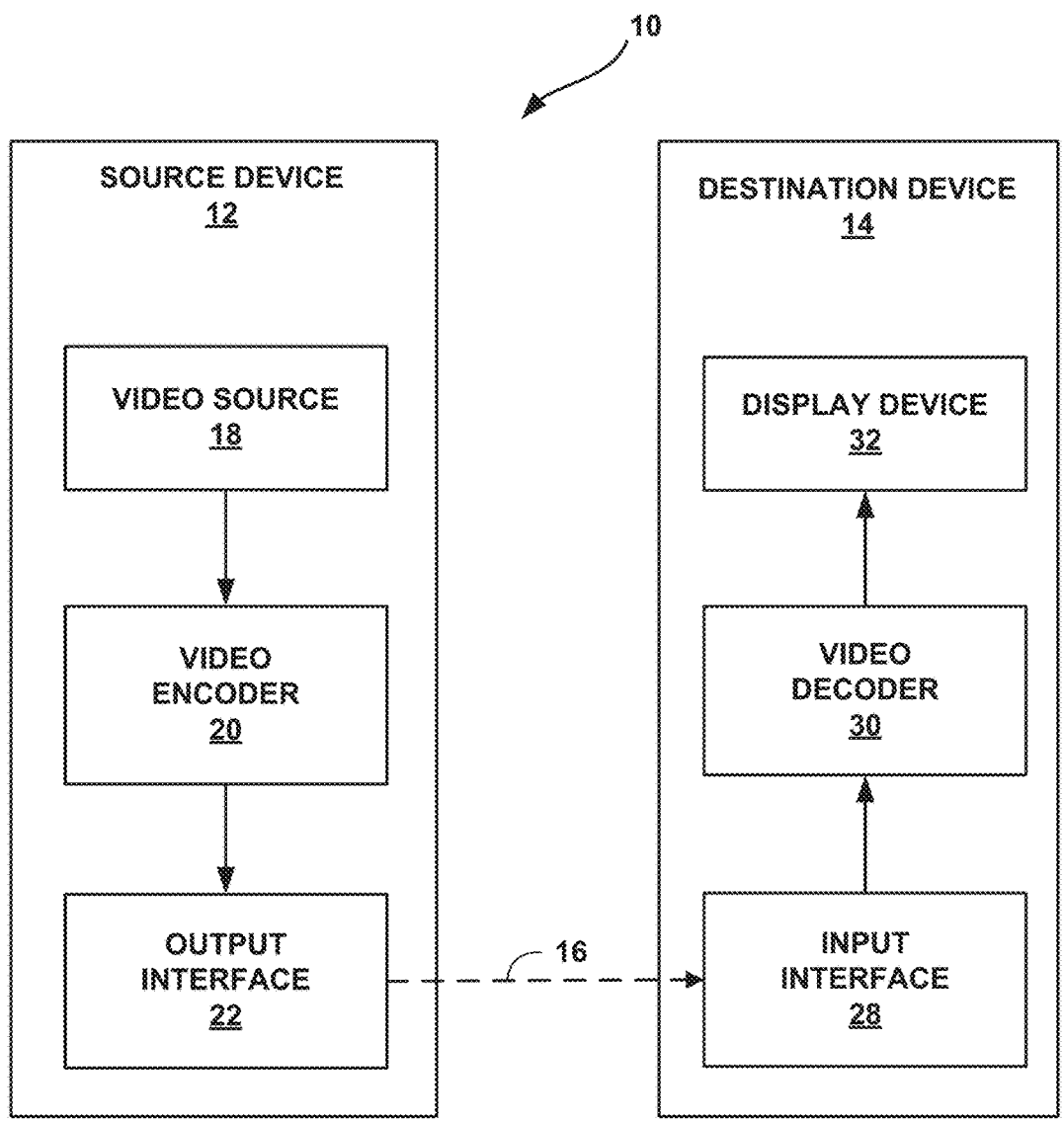
FIG. 1 is a block diagram illustrating an example video encoding and decoding system that may be configured to perform the techniques of this disclosure.

This disclosure describes techniques for improving the derivation of color gamut scalability (CGS) parameters and tables. In some examples, this disclosure describes encoder changes, such as detection of certain types of blocks and disabling inter-layer prediction in those blocks, and also the update of the number of partitions in a CGS table. Artifact identification in certain blocks and reduction of artifacts when using three-dimensional (3D) color prediction for color gamut scalability in multi-layer video coding is disclosed. The multi-layer video coding techniques of this disclosure may be in accordance the High Efficiency Video Coding (HEVC) standard, including any of a scalable video coding extension, a multiview video coding extension, a 3D video coding (i.e., multiview video coding plus depth) extension, or other multi-layer video coding extensions to HEVC. However, the techniques of this disclosure are not so limited, and may be used in conjunction with any scalable video coding standards or systems. The techniques of this disclosure may be used by video encoders and/or video decoders to generate inter-layer reference pictures when a color gamut for a lower layer of video data is different than a color gamut for a higher layer of the video data. In some examples, the techniques of this disclosure may also be used when a bit depth of the lower layer of video data is different than a bit depth for the higher layer of the video data.

A color gamut comprises a complete range of colors that can be reproduced for an image, e.g., in a picture, slice, block or layer of video data. Conventionally, in multi-layer video coding, a lower layer of video data (e.g., a base layer) and a higher layer of the video data (e.g., an enhancement layer) include color data in the same color gamut, e.g., high definition (HD) color gamut BT.709. In this case, a video encoder and/or video decoder may generate inter-layer reference pictures for the higher layer of the video data as up-sampled versions of co-located reference pictures for the lower layer of the video data. In some examples, the co-located reference pictures for the lower layer of the video data may be directly used as the inter-layer reference picture for the higher layer of the video data.

In some examples, however, a lower layer of video data may include color data in a first color gamut, e.g., a BT.709 color container, and a higher layer of the video data may include color data in a different, second color gamut, e.g., in a color gamut BT.2020 color container. In this example, in order to generate inter-layer reference pictures for the higher layer (e.g., enhancement layer) of the video data, a video encoder and/or video decoder may first perform color prediction to convert the color data of a reference picture in the first color gamut for the lower layer of the video data to the second color gamut for the higher layer of the video data.

The video encoder and/or video decoder may perform color prediction using a 3D lookup table for color gamut scalability. In some examples, a separate 3D lookup table may be generated for each of the color components, e.g., a luma (Y) component, a first chroma (Cr) component and a second chroma (Cb) component. Each of the 3D lookup tables includes a luma (Y) dimension, a first chroma (Cr) dimension and a second chroma (Cb) dimension, and is indexed using the three independent color components (Y, Cr, Cb). In this disclosure, the term "3D lookup table" and "CGS mapping table(s)" may be used interchangeably to describe a lookup table for performing color prediction for color gamut scalability.

In some example, the 3D lookup tables are symmetric, such that the 3D lookup tables have a same size for the luma component, the first chroma component and the second chroma component. In addition, the 3D lookup tables are balanced such that a size of each dimension of the 3D lookup tables is the same. This may result in large table sizes with high computational complexity and high signaling costs. For example, table sizes may be up to 9×9×9 or 17×17×17.

In U.S. patent application Ser. No. 14/512,177, filed Oct. 10, 2014, techniques are described that enable a video encoder and/or video decoder to generate an asymmetric and/or unbalanced 3D lookup table such that the 3D lookup table has a size that is different for the luma component than for the first chroma component and the second chroma component. The video encoder and/or video decoder may generate this asymmetric and/or unbalanced 3D lookup table by partitioning the luma component into a different number of segments than the first and second chroma components. In an example, 3D table sizes may be up to 8×2×2.

A video encoder may encode partition information and/or color values of a 3D lookup table generated for color gamut scalability. A video decoder may decode the partition information and/or color values to generate the 3D lookup table in order to perform color gamut scalability. The 3D lookup table may include asymmetric and/or unbalanced 3D lookup tables. For example, a video decoder and/or video encoder may generate a 3D lookup table with coarser partitioning for first and second chroma components and finer partitioning for a luma component by partitioning each of the color components into a number of octants according to a base partition value, e.g., a maximal split depth for the 3D lookup table, and then further partitioning each of the octants of the luma component based on a luma partition value. In this way, the chroma components of the 3D lookup table are partitioned into fewer octants (i.e., more coarsely partitioned) and the luma component of the 3D lookup table is partitioned into more octants (i.e., more finely partitioned).

Each of the color components may be partitioned into one or more octants in three dimensional color space based on one or more of the base partition value or the luma partition value. In this disclosure, the term "octant" is defined as a three dimensional region that includes eight vertexes.

In addition, based on at least one of the first or second chroma components of the 3D lookup table being partitioned into more than one octant, i.e., the base partition value being greater than one, the video encoder may signal a partitioning boundary for the one of the chroma components to the video decoder. The partitioning boundary defines an uneven partitioning of the one of the chroma components into two or more octants. In other words, one or both of the chroma components may not be partitioned into two or more even or equally sized octants. In this case, for a given one of the chroma components, at least one of the octants has a different size than the one or more other octants. In an example, the video encoder may only signal the partitioning boundary based on the condition that one of the chroma components is partitioned into more than one octant. Otherwise, the partition boundary is unnecessary and is not signaled to the video decoder.

A video encoder and/or a video decoder may generate a 3D lookup table based on a number of octants for each of the luma, first chroma, and second chroma color components, and color component values for each of the octants. As described above, in some cases, the number of octants for at least one of the color components of the 3D lookup table may also be signaled by the video encoder to the video decoder. In order for the video decoder to determine the color values in the 3D lookup table, color mapping coefficients for a linear color mapping function of the color values in the 3D lookup table are signaled by the video encoder to the video decoder. The linear color mapping function is used to convert color data in a first color gamut for a lower layer of video data to a second color gamut for a higher layer of video data, and the color mapping coefficients are weighting factors between color components of the lower and higher layers of the video data. For each of the color components, one of the color mapping coefficients may be a key coefficient that defines a weighting factor between the same color component of the lower and higher layers of the video data.

The color mapping coefficients of the linear color mapping function may be derived as floating point values. Before signaling the color mapping coefficients in a bitstream, the floating point values may be converted to integer values. Although integer values may be less accurate than floating point values, the integer values are easier to signal and integer operations are less computationally expensive than floating point operations. The conversion may use a bit-depth for the integer values based at least one of an input bit-depth or an output bit-depth of the 3D lookup table. In addition, the values of the color mapping coefficients may be restricted to be within a given range based on a predefined fixed value or a value dependent on at least one of an input bit-depth or an output bit-depth of the 3D lookup table.

One or more of the color mapping coefficients may be predicted such that residual values between original values of the color mapping coefficients and predicted values of the color mapping coefficients are encoded in the bitstream. For example, for a first octant for each of the color components, the color mapping coefficients of the linear color mapping function may be predicted based on predefined fixed values. In one example, a key coefficient of the linear color mapping function may be predicted based on a predicted value equal to a predefined non-zero value, and any remaining color mapping coefficients may be predicted based on a predicted value equal to zero. In this example, the color mapping coefficients of any remaining octants for each of the color components may be predicted based on predicted values from at least one previous octant, such as the first octant. In some cases, the residual values of the color mapping coefficients may be quantized based on a determined quantization value. The video encoder may signal the determined quantization value for the video decoder to perform inverse quantization to properly decode the color mapping coefficients.

The techniques of this disclosure are directed toward using CGS mapping tables and parameters to determine whether a coding or predictive block is likely to have artifacts if inter-layer prediction is used between different layers (e.g., a base layer and an enhancement layer). An encoder may use inter-layer prediction between these layers and may utilize a CGS map (which may include a 3D lookup tables for color gamut scalability) in translating color values (i.e., color prediction) between different representations of color pixels (e.g., a differing color gamut). Inter-layer prediction may include coding unit (CU)-level merge, prediction unit (PU)-level merge, skip modes, residual prediction related to the inter-layer prediction candidate.

To achieve high coding efficiency, specific color prediction or color mapping is helpful when generating inter-layer reference pictures. The derivation, by a video encoder, of the CGS mapping tables is performed for each partition of pixel color values in the color space (e.g., YUV domain). The pixel color value domain, a three dimensional (3D) domain of YUV or XYZ tristimulus values that specify a specific color given a specific color container, is split into rectangular cuboids, and the CGS parameters are obtained by minimizing the mean squared for pixel color values belonging to each cuboid. The pixel color value domain may also include XYZ tristimulus values to specify a specific color. Thus, each cuboid may be optimized independently. This may create mappings in a CGS mapping table where two-pixel color values that belong to two adjacent partitions have a small difference between each other but the mapped values for the two pixel color values are large. If an encoder were to use these pixel values to perform inter-layer prediction, the resulting block may include artifacts, such as contouring artifacts. These artifacts may typically appear in scalable coded data (SCD) where the enhancement layer data is high dynamic range (HDR) data, and the base layer is standard dynamic range (SDR) data that is manually graded from the HDR content. Manually grading may be used to refer to the technique where HDR content is graded to occupy a smaller volume by a colorist rather than by, e.g., an automatic algorithm. In this disclosure, the terms "partition," "octant," "segment," and "cuboid," may be used interchangeably to describe the partitioned regions of the color components of the 3D lookup table.

According to the techniques of this disclosure, a video encoder may identify pixel color values (or pairs of values) on a boundary (or multiple boundaries) of adjacent rectangular cuboids in a three dimensional color space. For each block (e.g., PU or CU) of a SCD enhancement layer, a video coding device may detect whether the block would contain artifacts if encoded with inter-layer prediction based on a SCD base layer. Where potential artifacts are detected, the video coding device may take one or more steps to ensure the foregoing artifacts are not created by the encoding process.

According to one example, blocks that potentially contain artifacts are detected and inter-layer prediction is disabled in the encoder rate-distortion (RD) decisions.

According to another example, for any partition boundary of a rectangular cuboid, a threshold x_a is defined and all the pixel values that fall within the threshold pixel value of the partition boundary are collected in a list. For each partition boundary, the pixels in either partition are stored separately.

In some examples, the pixels are collected for all partition boundaries in all color components (e.g., luma and two chromatic components in the YUV color domain). In another example, the pixels may only be collected for partition boundaries along the luma axis. For example, if a luma partition occurs between pixel values 127 and 128, and the threshold value (of, e.g., x_a) is 4, then all pixels that belong the first partition and have luma values in the range [124,127] are collected in the first list, and all pixels in the second partition and that have luma values in the range [128,131] are collected in the second list. In a further example, for each partition boundary, different threshold values (e.g., x_a1 and x_a2) could be used for the partitions that share the partition boundary.

According to another example, two threshold values, x_b and x_c, are defined and for each combination of component pixel color values from the two lists, i.e. value k from the first list and a value k2 from the second list, two comparisons are made (a pixel value difference check). If the difference between k1 and k2 does not exceed x_b (indicating that the pixel value differences in the base layer domain is relatively small), and the difference between the mapped values of k1 and k2 (using the respective CGS tables for each partition) exceeds x_c, then the block is marked as potentially containing artifacts.

In some examples, one or more pairs of thresholds (x_b and x_c) are defined and the pixel color value difference check is performed for each pair of thresholds. The block is marked as potentially containing artifacts when a subset of the checks, or in other examples all of the checks, are satisfied. For example, one pair of threshold values can be applied to detect a relatively larger difference (where, e.g., x_b and x_c are relatively larger) and another pair of threshold values can be applied to detect relatively smaller changes (where, e.g., x_b and x_c are relatively smaller). In another example, a threshold number of pixel color value pairs t is defined such that only when the number of pairs that satisfy the above pixel condition check is above t, the block is marked as potentially containing artifacts. In a further example, the pixel color value difference check is only performed for a subset of the partition boundaries. For example, artifacts in the luma values in the middle range [256, 384] may be particularly visible, and some of the pixel value checks are only performed when the partition boundary falls in this range. In another example, the pixel value difference check for a pair of threshold values (x_b, x_c) is only applied when the variance of the pixels values of the blocks does not exceed a certain threshold. Low pixel variance may denote relatively flat regions of an image where artifacts are more likely to be visible. Artifacts may be less visible in regions that are not relatively flat which may be approximated by having a high pixel value difference.

According to another example, the CGS mapping that is used for pixel color values in a partition is modified so that the CGS map corresponding to the partition that contains the maximum number of pixels in that particular block is used to map all, or substantially all, the pixel color values in the block.

According to another example, the estimation of the CGS parameters is updated such that mean square estimation does not include pixel color values that are outliers. For example, a two-pass estimation method may be used so that the first pass conducts the estimation of CGS parameters of a partition based on all the pixel color values in the partition. In the second pass, all the pixel color values whose error (e.g., a difference between the corresponding mapped value and the original enhancement layer reference) exceeds a particular threshold are excluded, and only the rest of the pixel color values in the partition are used to compute the CGS parameters of the partition. This example may allow for more robust CGS parameter estimation.

According to another example CGS parameters may be updated more aggressively in order to take advantage of better mapping functions (as more partitions give a better estimate of the mapped picture) taking in to account that the bit rate of the CGS parameters does not exceed a certain value. The number of CGS partitions is updated based on a CGS bit budget—i.e. the ratio of the number of bits corresponding to the CGS parameters that have been sent until the current picture to the total number of bits sent until the current picture. A more aggressive update of the number of partitions is designed such that when the CGS bit budget goes below a certain threshold, the number of partitions is increased based on how many partitions was estimated to be the best number for the previous picture. When the CGS bit budget drops below a certain threshold, e.g., if number of partitions for the previous picture was less than or equal to 3, the number of partitions for the current picture may be increased, e.g., by 2. Where the bit budget drops a lesser amount, the number of partitions is increased by a lesser amount, e.g., by 1Similarly, when the CGS bit budget exceeds a threshold value, the number of partitions is reduced based on the best number of partitions for the previous picture. Additionally, when the CGS bit budget falls between these two thresholds, if the number of current partitions is adjusted based on whether there is a large (or small) number of partitions currently, e.g., when the number of partitions is greater than 6, decrease the number by 1 and where the number of partitions is less than 3, increase the number of partitions by 1. In some examples, a variable used to derive the number of partitions may be used in place of the number of partitions.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.it-sudparis.eu/jct/doc_end_user/documents/18 Sapporo/wgllaCTVC-R1013-v6.zip.

The multi-view extension to HEVC, namely MV-HEVC, and HEVC extension for more advanced 3D video coding (3D-HEVC) are being developed by the JCT-3V, and meanwhile, the scalable video coding extension to HEVC, namely SHVC, is being developed by the JCT-VC. The HEVC WD also includes latest specification of MV-HEVC and SHVC. The latest WD of 3D-HEVC, referred to as 3D-HEVC WD1 hereinafter, is available from http://phenix.it-sudparis.eu/jct2/doc_end user/documents/11_Geneva/wg11/CT3V-K1001-v9. zip.

FIG. 1 is a block diagram illustrating an example video encoding and decoding system 10 that may utilize techniques for artifact detection and removal in a 3D lookup table based color gamut scalability video coding process. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for processing video data in parallel. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual.

In the example of FIG. 1, video encoder 20 and video decoder 30 may operate according to the High Efficiency Video Coding (HEVC) standard finalized by the Joint Collaboration Team on Video Coding (JCT-VC) of ITU-T Video Coding Experts Group (VCEG) and ISO/IEC Motion Picture Experts Group (MPEG).

In HEVC and other video coding standards, a video sequence typically includes a series of pictures. Pictures may also be referred to as "frames." A picture may include three sample arrays, denoted SL, So, and Scr. SL is a two-dimensional array (i.e., a block) of luma samples. So is a two-dimensional array of Cb chrominance samples. Scr is a two-dimensional array of Cr chrominance samples.

Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RB SP for a coded slice, a third type of NAL unit may encapsulate a RB SP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RB SP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

In MV-HEVC, 3D-HEVC, and SHVC, a video encoder may generate a multi-layer bitstream that comprises a series of network abstraction layer (NAL) units. Different NAL units of the bitstream may be associated with different layers of the bitstream. A layer may be defined as a set of video coding layer (VCL) NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In 3D video coding, a layer may contain either all coded depth pictures of a specific view or coded texture pictures of a specific view. Similarly, in the context of scalable video coding, a layer typically corresponds to coded pictures having video characteristics different from coded pictures in other layers. Such video characteristics typically include spatial resolution and quality level (Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. NAL units only encapsulate data of a single layer. In SHVC, a view may be referred to as a "base layer" if a video decoder can decode pictures in the view without reference to data of any other layer. The base layer may conform to the HEVC base specification. Thus, NAL units encapsulating data of the highest remaining layer of the bitstream may be removed from the bitstream without affecting the decodability of data in the remaining layers of the bitstream. In MV-HEVC and 3D-HEVC, higher layers may include additional view components. In SHVC, higher layers may include signal to noise ratio (SNR) enhancement data, spatial enhancement data, and/or temporal enhancement data.

In some examples, data in a higher layer may be decoded with reference to data in one or more lower layers. The lower layers may be used as reference pictures to compress the higher layer using inter-layer prediction. The data of the lower layers may be up-sampled to have the same resolution as the higher layers. In general, video encoder 20 and video decoder 30 may perform inter-layer prediction in a similar manner as inter prediction described above, except one or more up-sampled lower layers may be used as reference pictures as opposed to one or more neighboring pictures.

Video encoder 20 may and/or video decoder 30 may generate a 3D lookup table for color gamut scalability based on a number of octants for each of the luma, first chroma, and second chroma color components, and color values for each of the octants. In some cases, the number of octants for at least one of the color components of the 3D lookup table may also be signaled by the video encoder 20 to the video decoder 30 as CGS parameters. In order for video decoder 30 to determine the color values in the 3D lookup table, color mapping coefficients for a linear color mapping function of the color values in the 3D lookup table are signaled by the video encoder 20 to the video decoder 30 via CGS parameters. Video encoder 20 may derive the CGS mapping tables for each partition of pixel values in a color domain (e.g., the YUV domain), splitting the color domain into rectangular cuboids and minimizing the mean squared error of mapped values for pixels belonging to each rectangular cuboid with respect to the values of the corresponding pixels of the enhancement layer picture. As each rectangular cuboid is optimized independently, artifacts (e.g., contouring artifacts) may appear in the video encoded by video encoder 20 and decoded by video decoder 30.

Video encoder 20 may minimize such artifacts by detecting potential artifacts and making coding decision to minimize or prevent such artifacts. For example, video encoder 20 may disable inter-layer prediction for each block utilizing pixel values that may create artifacts which can be decoded by video decoder 30.

Video encoder 20 may also alter the CGS mapping that is used for pixel color values so that the CGS mapping table corresponding to the partition that contains the maximum number of pixel color values in that particular block is used to map all the pixel color values in the block.

Video encoder 20 may also use a multi-pass method of avoiding artifacts through better estimation of CGS parameters. CGS parameters may be updated such that the mean square estimation does not include pixel color values that are outliers. For example, a two-pass estimation method may be used so that video encoder 20, in a first pass, conducts estimation of CGS parameters of a partition based on all the pixel color values in the partition. Then, in a second pass, all the pixel color values whose error exceeds a particular threshold are excluded and only the rest of the pixel values in the partition are used to compute the CGS parameters of the partition.

Video encoder 20 may also update CGS parameters by updating the CGS partitions based on a CGS bit budget, taking advantage of mapping functions. For example, when the CGS bit budget goes below a first threshold, the number of partitions may be increased based on how many partitions were estimated for the previous picture. When the CGS bit budget exceeds a second threshold value, the number of partitions may be reduced based on the number of partitions for the previous picture. When the CGS bit budget falls between these two thresholds the number of current partitions may be adjusted based on whether the number of partitions is larger or small.

Figure 2:
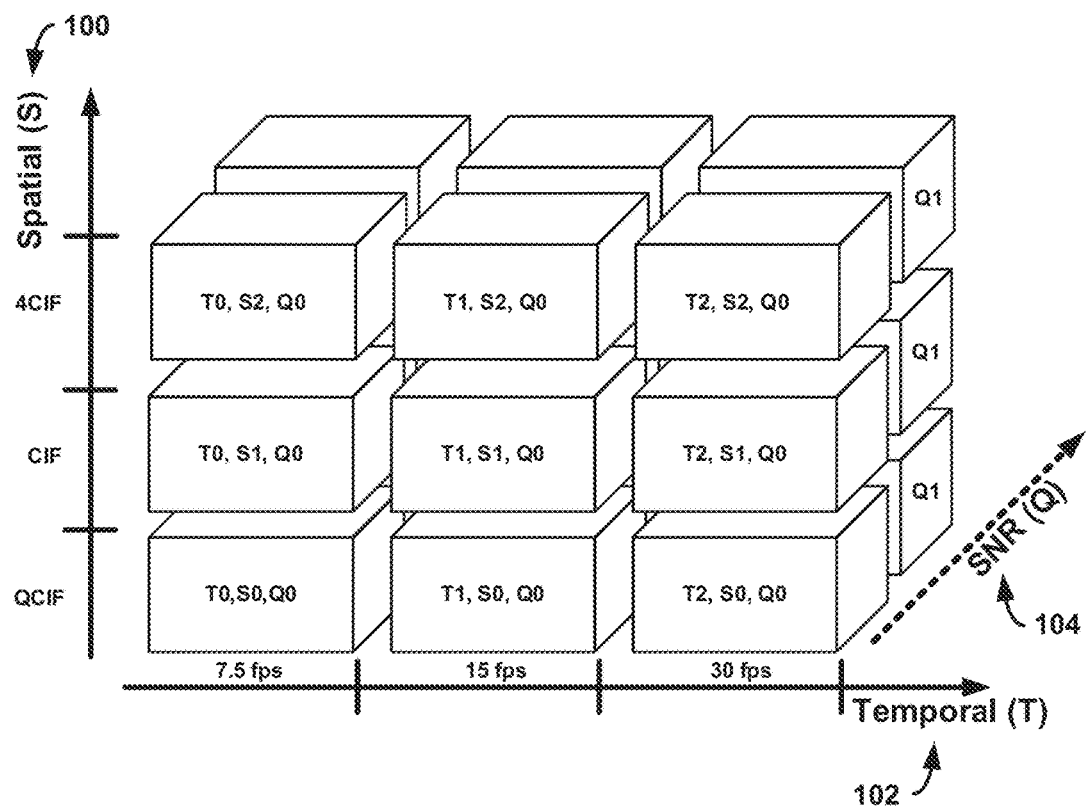
FIG. 2 is a conceptual illustration showing an example of scalability in three different dimensions.

FIG. 2 is a conceptual illustration showing an example of scalability in three different dimensions. In a scalable video coding structure, scalabilities are enabled in three dimensions. In the example of FIG. 2, the scalabilities are enabled in a spatial (S) dimension 100, a temporal (T) dimension 102, and a signal-to-noise ratio (SNR) or quality (Q) dimension 104. In the temporal dimension 102, frame rates with 7.5 Hz (T0), 15 Hz (T1) or 30 Hz (T2), for example, may be supported by temporal scalability. When spatial scalability is supported, different resolutions such as Quarter Common Intermediate Format (QCIF) (S0), Common Intermediate Format (CIF) (S1) and 4×CIF (4CIF) (S2), for example, are enabled in the spatial dimension 100. For each specific spatial resolution and frame rate, SNR layers (Q1) can be added in the SNR dimension 104 to improve the picture quality. Additional resolution formats include 16×CIF (16CIF). CIF is a format used to standardize horizontal and vertical resolutions in pixels of YCbCr sequences in video signals. Other resolution standards may be used in place of CIF as would be understood by one of ordinary skill.

Once video content has been encoded in such a scalable way, an extractor tool may be used to adapt the actual delivered content according to application requirements, which are dependent e.g., on the clients or the transmission channel. In the example shown in FIG. 2, each cubic contains pictures with the same frame rate (temporal level), spatial resolution, and SNR layers. Better representation may be achieved by adding cubes (i.e., pictures) in any of dimensions 100, 102 or 104. Combined scalability is supported when there are two, three or even more scalabilities enabled.

In scalable video coding standards, such as the SVC extension to H.264 or SHVC, the pictures with the lowest spatial and SNR layer are compatible with the single layer video codec, and the pictures at the lowest temporal level form the temporal base layer, which may be enhanced with pictures at higher temporal levels. In addition to the base layer, several spatial and/or SNR enhancement layers may be added to provide spatial and/or quality scalabilities. Each spatial or SNR enhancement layer itself may be temporally scalable, with the same temporal scalability structure as the base layer. For one spatial or SNR enhancement layer, the lower layer it depends on may be referred as the base layer of that specific spatial or SNR enhancement layer.

Figure 3:
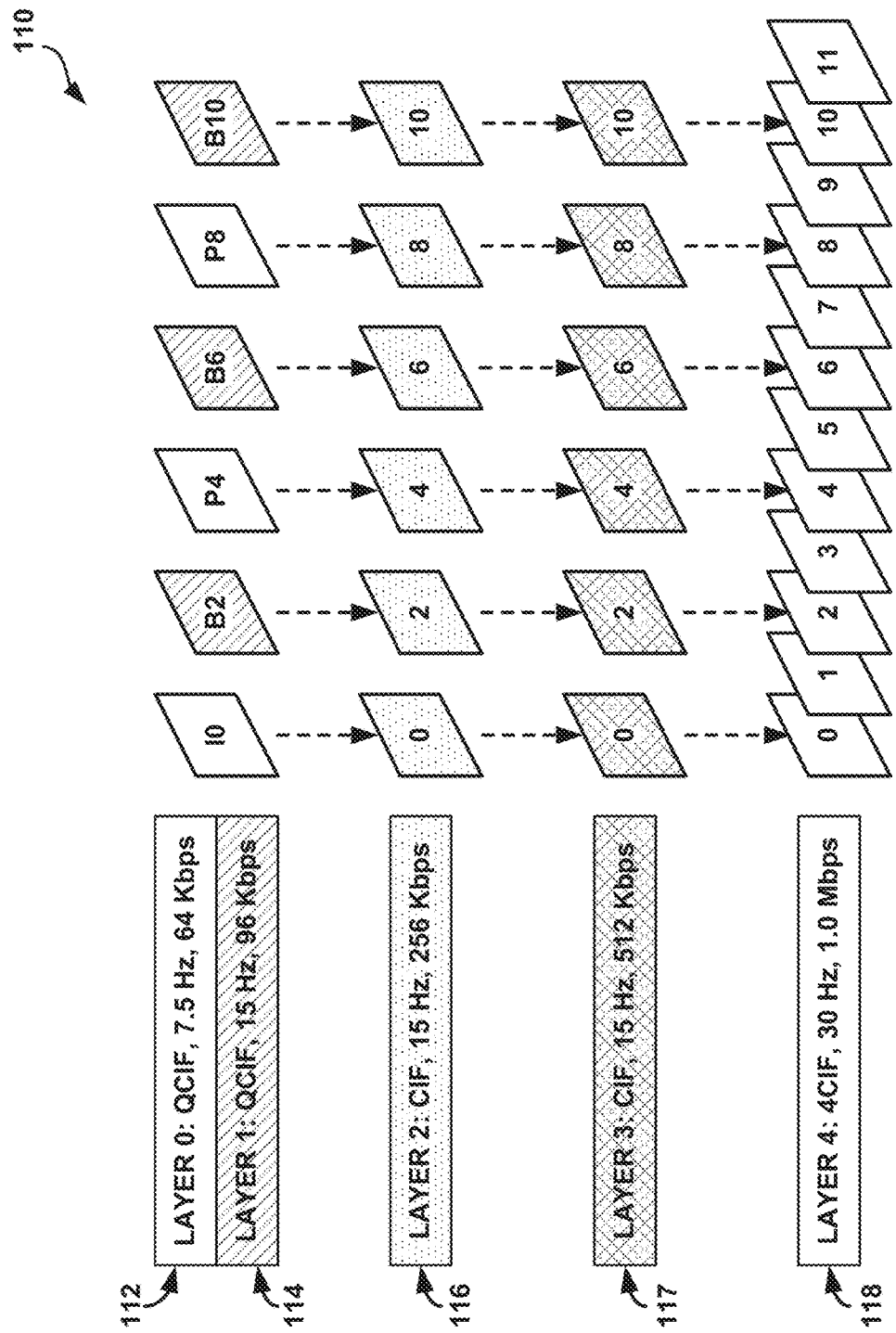
FIG. 3 is a conceptual illustration showing an example structure of a scalable video coding bitstream.

FIG. 3 is a conceptual illustration showing an example structure 110 of a scalable video coding bitstream. The bitstream structure 110 includes a layer 0 112 that includes pictures or slices I0, P4 and P8, and a layer 1 114 that includes pictures or slices B2, B6 and B10. In addition, bitstream structure 110 includes a layer 2 116 and a layer 3 117 that each includes pictures 0, 2, 4, 6, 8 and 10, and a layer 4 118 that includes pictures 0 through 11.

A base layer has the lowest spatial and quality layer (i.e., pictures in layer 0 112 and layer 1 214 with QCIF resolution). Among them, those pictures of the lowest temporal level form the temporal base layer, as shown in layer 0 112 of FIG. 3. The temporal base layer (layer 0) 112 can be enhanced with pictures of a higher temporal level, e.g., layer 1 114 with frame rate of 15 Hz or layer 4 118 with frame rate of 30 Hz.

In addition to the base layer 112, 114, several spatial and/or SNR enhancement layers may be added to provide spatial and/or quality scalabilities. For example, layer 2 116 with CIF resolution may be a spatial enhancement layer to base layer 112, 114. In another example, layer 3 117 may be an SNR enhancement layer to base layer 112, 114 and layer 2 116. As shown in FIG. 3, each spatial or SNR enhancement layer itself may be temporally scalable, with the same temporal scalability structure as the base layer 112, 114. In addition, an enhancement layer may enhance both spatial resolution and frame rate. For example, layer 4 118 provides a 4CIF resolution enhancement layer, which further increases the frame rate from 15 Hz to 30 Hz.

Figure 4:
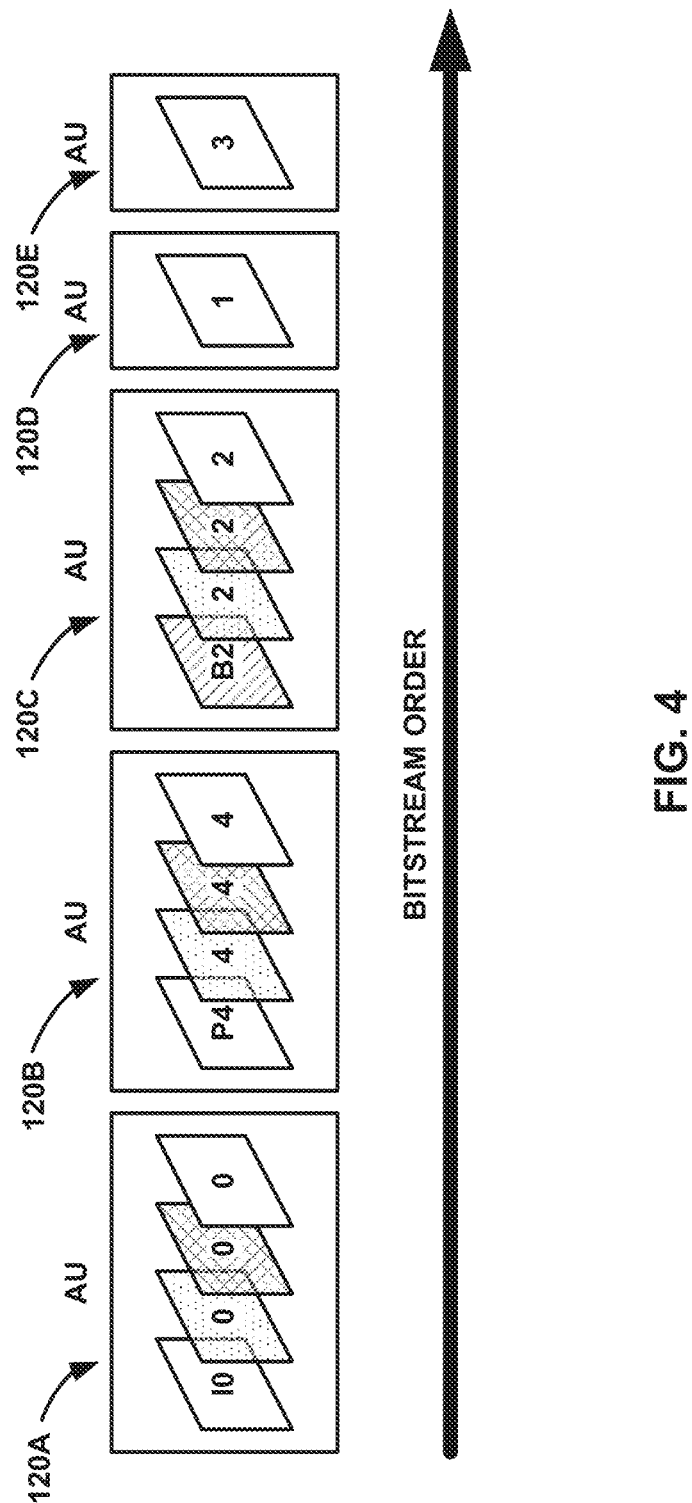
FIG. 4 is a conceptual illustration showing example scalable video coding access units in bitstream order.

FIG. 4 is a conceptual illustration showing example scalable video coding access units 120A-120E ("access units 120") in bitstream order. As shown in FIG. 4, the coded pictures or slices in the same time instance are successive in the bitstream order and form one access unit in the context of a scalable video coding standard, such as the SVC extension to H.264 or SHVC. The access units 120 then follow the decoding order, which could be different from the display order and determined, for example, by the temporal prediction relationship between access units 120.

For example, access unit 120A includes picture 10 from layer 0 112, picture 0 from layer 2 116, picture 0 from layer 3 117, and picture 0 from layer 4 118. Access unit 120B includes picture P4 from layer 0 112, picture 4 from layer 2 116, picture 4 from layer 3 117, and picture 4 from layer 4 118. Access unit 120C includes picture B2 from layer 1 114, picture 2 from layer 2 116, picture 2 from layer 3 117, and picture 2 from layer 4 118. Access unit 120D includes picture 1 from layer 4 118, and access unit 120E includes picture 3 from layer 4 118.

Figure 5:
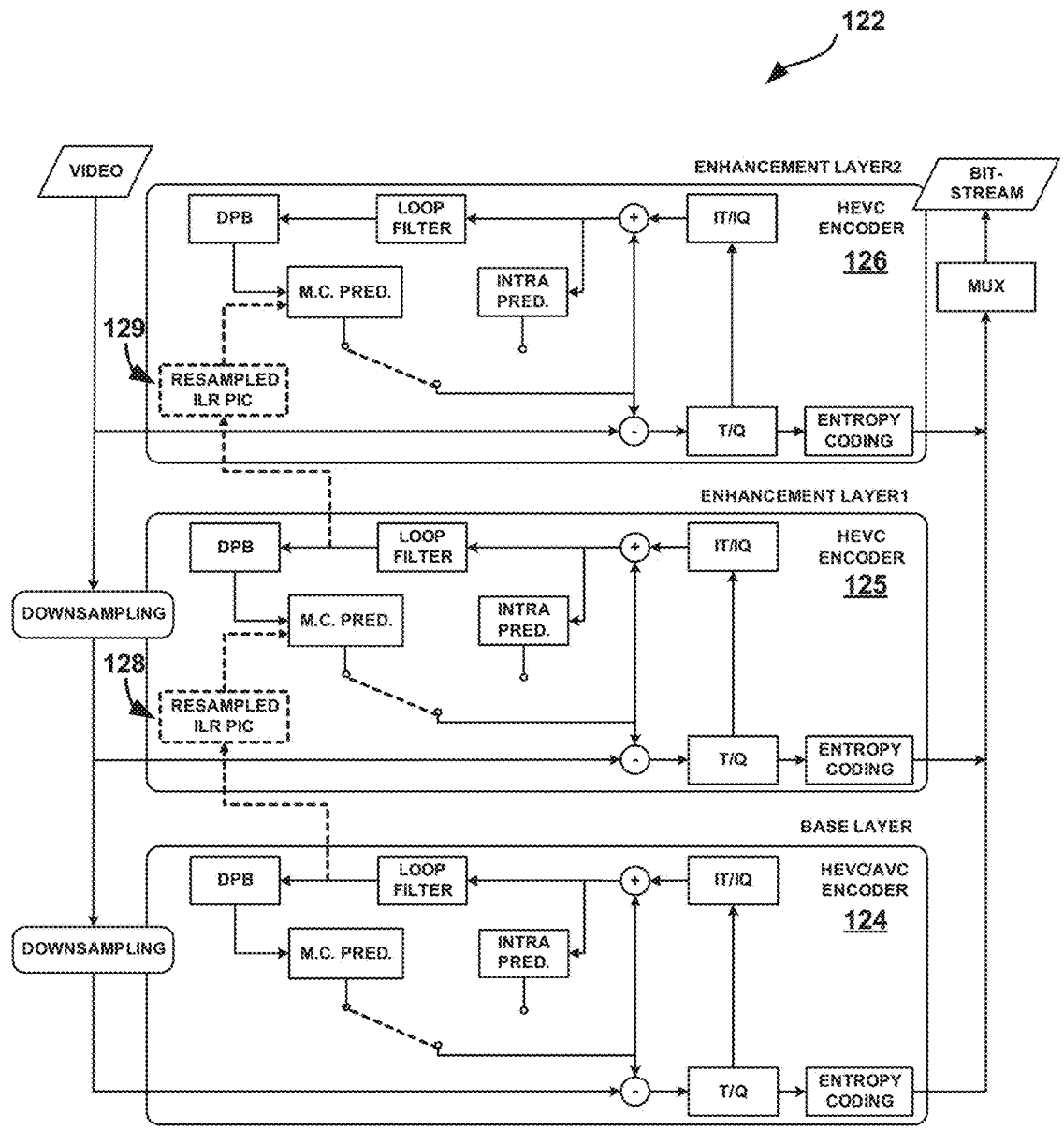
FIG. 5 is a block diagram illustrating an example scalable video coding extension to an HEVC (SHVC) encoder.

FIG. 5 is a block diagram illustrating an example 3-layer SHVC encoder 122. As illustrated in FIG. 5, SHVC encoder 122 includes a base layer encoder 124, a first enhancement layer encoder 125 and a second enhancement layer encoder 126. In high-level syntax only SHVC, there are no new block level coding tools when compared to HEVC single layer coding. In SHVC, only slice and above level syntax changes and picture level operation, such as picture filtering or up-sampling, are allowed. In some examples, instead of downsampling the video before sending it to encoders 125 and 124, a version of the video that may be automatically or manually graded so as to be rendered in a display that has a lower color volume is used.

To reduce the redundancy between layers, up-sampled co-located reference layer pictures for a lower/base layer may generated and stored in a reference buffer for a higher/enhancement layer so that inter-layer prediction may be achieved in the same way as inter-frame prediction within a single layer. As illustrated in FIG. 5, a resampled inter-layer reference (ILR) picture 128 is generated from a reference picture in base layer encoder 124 and stored in first enhancement layer encoder 125. Similarly, a resampled ILR picture 129 is generated from a reference picture in first enhancement layer encoder 125 and stored in second enhancement layer encoder 126. In SHVC WD3, the ILR picture is marked as a long term reference picture for the enhancement layer. The motion vector difference associated with an inter-layer reference picture is constrained to zero.

The use of ultra-high definition television (UHDTV) devices and content may use a different color gamut than legacy devices. Specifically, SD and HD (as opposed to HDR) uses the BT.709 recommendation, ITU-R Recommendation BT.709 "Parameter values for the HDTV standards for production and international programme exchange" December 2010, while UHDTV uses the BT.2020 recommendation, ITU-R Recommendation BT.2020 "Parameter values for UHDTV systems for production and international programme exchange" April 2012. A color gamut comprises a complete range of colors that can be reproduced for an image, e.g., in a picture, slice, block or layer of video data. One difference between these systems is that the col or gamut of UHDTV is significantly larger than HD. It is asserted that UHDTV provides a more life-like or realistic viewing experience, which is consistent with other UHDTV characteristics, such as high resolution.

In some example SVC codes, enhancement layers 1 and/or 2 may utilize a different color gamut than the base layer or each other. For example, one layer may encode HD video (using a BT.709 color gamut) whereas an enhancement layer may utilize UHD video (using a BT.2020 color gamut). If the encoders 124, 125, and/or 126 utilize inter-layer prediction between the HD video and the UHD video, color information may be translated between the two color formats and gamuts via a CGS mapping table. The pixel value domain is split into rectangular cuboid partitions. HEVC encoders 124, 125, and/or 126 may each derive CGS mapping tables via splitting the pixel value domain into a plurality of partitions (e.g., rectangular cuboids) in the color domain (e.g., YUV or YCbCr domain) and minimizing the mean squared for pixels belonging to each cuboid with respect to the enhancement layer (1 and/or 2) picture for each partition. Since each partition is optimized independently, it cannot be guaranteed that for two pixel values that belong to two adjacent partitions (with a small difference in value) the difference in the mapped values for the two pixel values would not be large. As a result, when these mapped values are used as inter-layer prediction references for the enhancement layer picture/blocks, some artifacts appear in some frames of the sequences. This may be minimized by encoders 124, 126, and/or 126 by detecting blocks that may potentially contain these artifacts and disabling inter-layer prediction (between the base and one or enhancement layers 1 or 2) for the blocks that may potentially contain artifacts.

Figure 6:
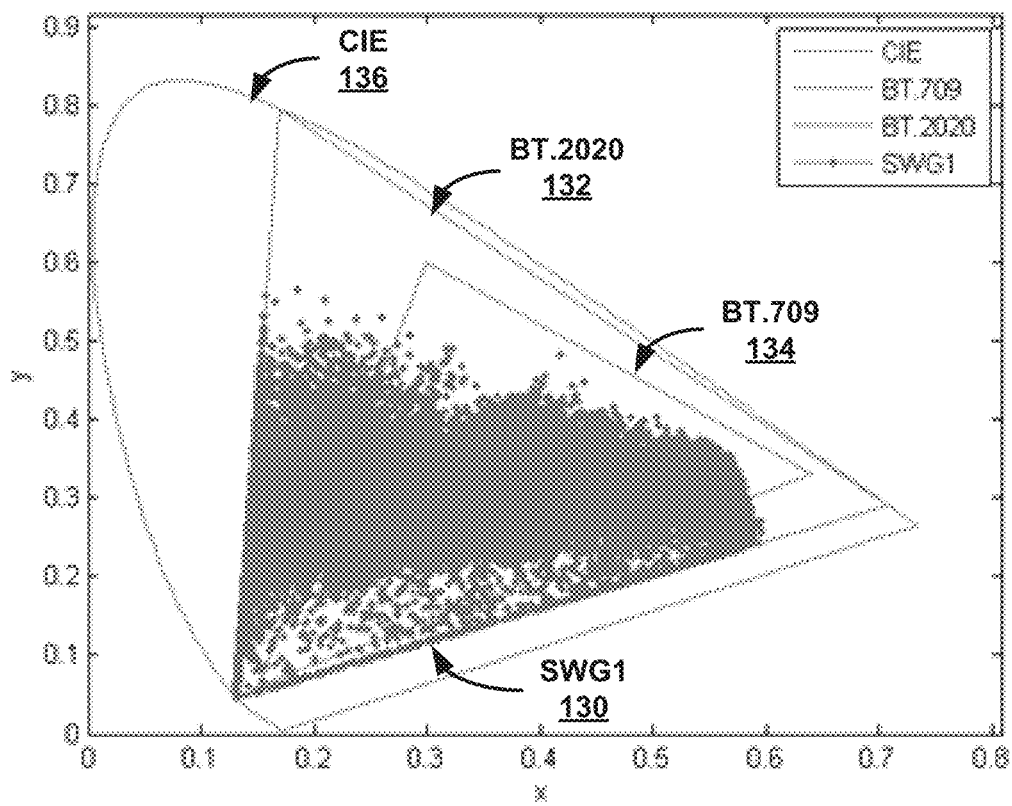
FIG. 6 is a graph illustrating example color gamuts relative to a sample video sequence.

FIG. 6 is a graph illustrating an example color gamut of a sample video sequence 130. As illustrated in FIG. 6, the SWG1 sample video sequence 130 is indicated as a cluster of dots within a line outline of the UHD color gamut BT.2020 132. For comparison purposes, an outline of the HD color gamut BT.709 134 and an outline of the International Commission on Illumination (CIE)-XYZ linear color space 136 overlays the SWG1 sample video sequence 130. It is easily observed from FIG. 6 that the UHD color gamut BT.2020 132 is much larger than the HD color gamut BT.709 134. Note the number of pixels in the SWG1 sample video sequence 130 that fall outside of the BT.709 color gamut 134.

Figure 7:
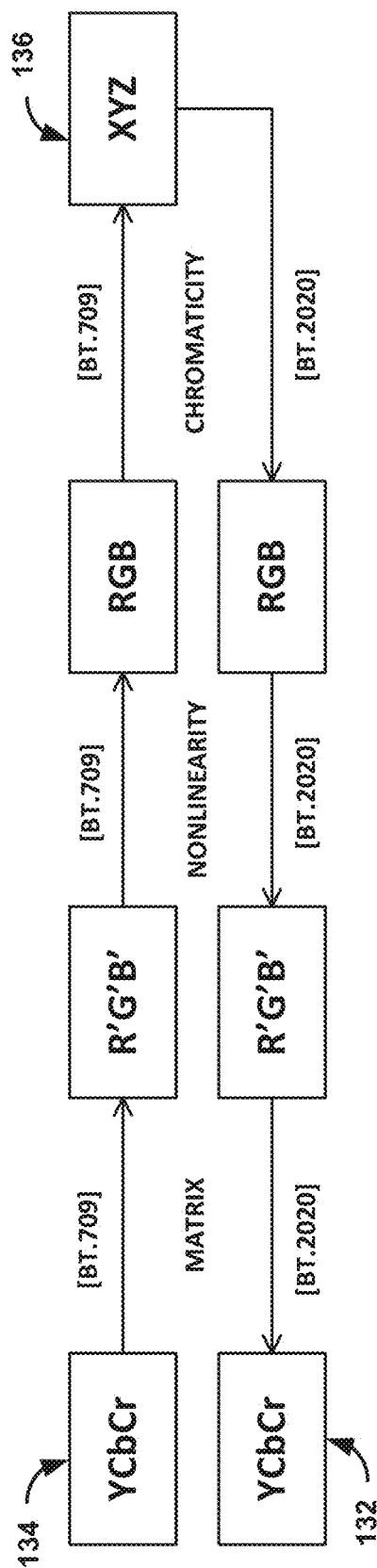
FIG. 7 is a block diagram illustrating conversion from high definition (HD) color gamut BT.709 to ultra-high definition (UHD) color gamut BT.2020.

FIG. 7 is a block diagram illustrating conversion from HD color gamut BT.709 134 to UHD color gamut BT.2020 132. Both the HD color gamut BT.709 134 and the UHD color gamut BT.2020 132 define representations of color pixels in luma and chroma components (e.g., YCbCr or YUV). Each color gamut defines conversion to and from the CIE-XYZ linear color space 136. This common intermediate color space may be used to define the conversion of the luma and chroma values in the HD color gamut BT.709 134 to corresponding luma and chroma values in the UHD color gamut BT.2020 132.

A CGS mapping is applied on a base layer picture to generate an inter-layer reference picture. Without the use of CGS, the base picture would be used as the inter-layer reference picture directly if the base and enhancement layers are the same resolution. The CGS mapping is a linear function defined based on the CGS parameters. The CGS parameters that are used in the CGS mapping are obtained by minimizing the mean squared error (e.g., optimizing) between the CGS-mapped base layer picture and the original enhancement layer picture at the encoder. Such optimization may occur by default in the reference software as the CGS parameters of each rectangular cuboid are estimated by the reference software independently at the encoder.

More details regarding the color gamut of the sample sequence illustrated in FIG. 6 and the color gamut conversion illustrated in FIG. 7 may be found in L. Kerofsky, A. Segall, S.-H. Kim, K. Misra, "Color Gamut Scalable Video Coding: New Results," JCTVC-L0334, Geneva, CH, 14-23 Jan. 2013 (hereinafter referred to as "JCTVC-L0334").

Figure 8:
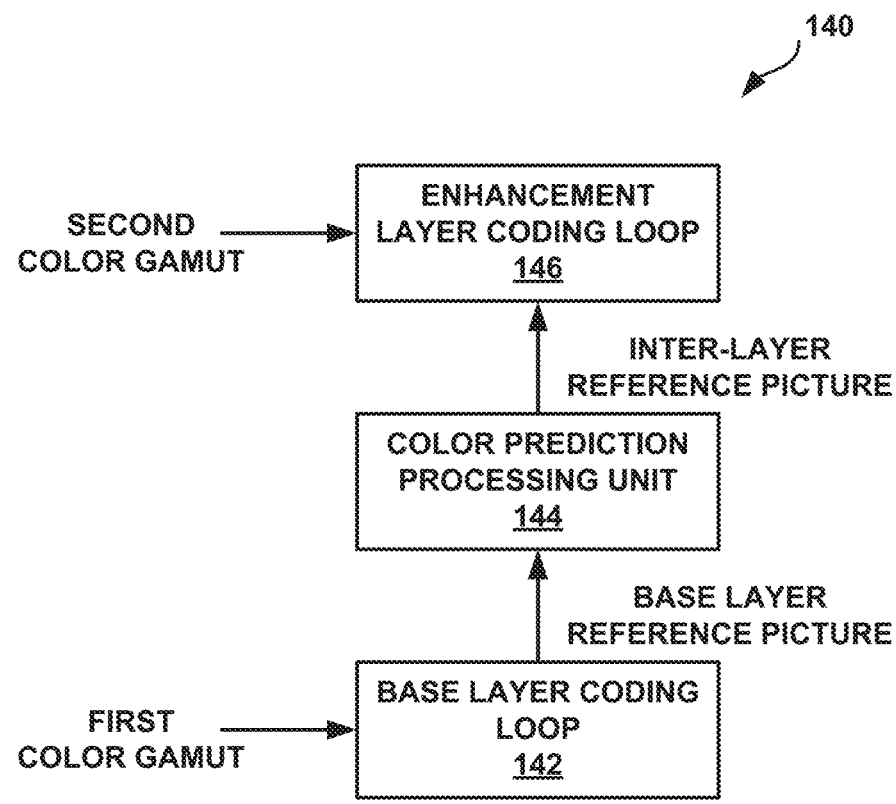
FIG. 8 is a block diagram illustrating a color gamut scalable coder including a color prediction processing unit that may generate an inter-layer reference picture when a base layer color gamut and an enhancement layer color gamut are different.

FIG. 8 is a block diagram illustrating a color gamut scalable coder 140 including a color prediction processing unit 144 that may generate an inter-layer reference picture when a base layer color gamut and an enhancement layer color gamut are different. Color prediction processing unit 144 may be used by a video coder, such as video encoder 20 or video decoder 30 from FIG. 1, to perform color gamut scalable video coding, in which the color gamut of the base and enhancement layer is different.

In the example illustrated in FIG. 8, a base layer coding loop 142 performs video coding of pictures that include color data in a first color gamut, e.g., BT.709, and an enhancement layer coding loop 146 performs video coding of pictures that include color data in a second color gamut, e.g., BT.2020. Color prediction processing unit 144 performs color prediction to map or convert color data of a base layer reference picture in the first color gamut to the second color gamut, and generates an inter-layer reference picture for the enhancement layer based on the mapped color data of the base layer reference picture.

To achieve high coding efficiency, color prediction processing unit 144 is configured to perform specific color prediction when generating inter-layer reference pictures. As described in more detail below, color prediction processing unit 144 may be configured to perform color prediction according to any of a linear prediction model, a piecewise linear prediction model, or a 3D lookup table based color prediction model.

Figure 9:
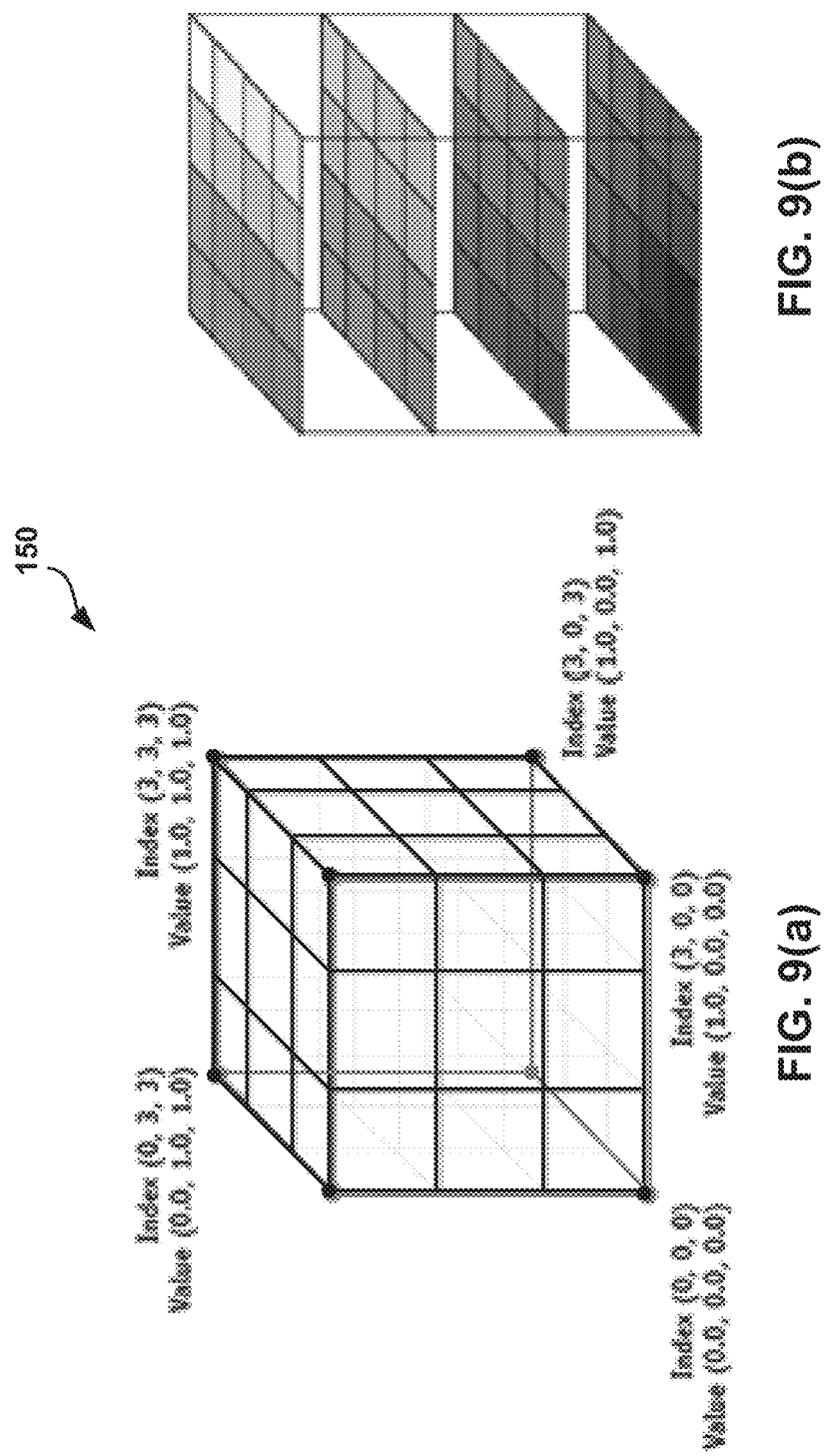
FIGS. 9(a) and 9(b) are conceptual illustrations showing example 3D lookup tables for color gamut scalability.

FIGS. 9(*a*) and 9(*b*) are conceptual illustrations showing an example 3D lookup table 150 for color gamut scalability. The principle of the 3D lookup table for color gamut scalability is depicted in FIGS. 9(*a*) and 9(*b*). The 3D lookup table 150 can be considered as a sub-sampling of a first 3D color space, e.g., HD color gamut BT.709, where each vertex is associated with a color triplet (y, u, v) (or color triplet x, y, z) corresponding to a second 3D color space (i.e., predicted) values, e.g., UHD color gamut BT.2020).

In general, the first color gamut may be partitioned into octants or cuboids in each color dimension (i.e., Y, U, and V), and the vertices of the octants are associated with the color triplet corresponding to the second color gamut and used to populate 3D lookup table 150. The number of vertices or segments in each color dimension indicates the size of 3D lookup table. FIG. 9(*a*) illustrates the vertices or intersecting lattice points of the octants in each color dimension. FIG. 9(*b*) illustrates the different color values associated with each of the vertices. As illustrated, in FIG. 9(*a*) each color dimension has four vertices and in FIG. 9(*b*) each color dimension includes four color values.

In some examples, a separate 3D lookup table may be generated for each of the color components, i.e., a luma (Y) component, a first chroma (U) component and a second chroma (V) component. Each of the 3D lookup tables includes a luma (Y) dimension, a first chroma (U) dimension and a second chroma (V) dimension, and is indexed using the three independent color components (Y, U, V).

In general, 3D lookup table based color gamut scalability results in improved coding performance. The size of the 3D lookup table may be a concern, however, since the 3D lookup table is typically stored in cache memory in a hardware implementation. In some examples, the 3D lookup tables are symmetric such that the 3D lookup tables have a same size for the luma component, the first chroma component and the second chroma component. In addition, the 3D lookup tables may be balanced such that a size of each dimension of the 3D lookup tables is the same. This results in large table sizes with high computational complexity and high signaling costs. For example, table sizes may be up to 9×9×9 or 17×17×17.

In some cases, the size of the 3D lookup table used for color gamut scalability is too large, which may lead to difficulty in practical implementations. In addition, the large table size and the use of tri-linear interpolation for the 3D lookup table results in high computational complexity.

In one example, the techniques described in this disclosure may provide more efficient partitioning of the color components of the 3D lookup table by enabling asymmetric partitions such that the 3D lookup table has coarser partitioning for first and second chroma (e.g., Cb and Cr or U and V) components and finer partitioning for a luma (e.g., Y) component. The techniques may also provide more efficient signaling of the partition information for the 3D lookup table by signaling a number of additional partitions for the luma component on top of a base number of partitions for the 3D lookup table. In another example, the techniques may provide more efficient partitioning of the color components of the 3D lookup table by enabling joint partitioning of the first and second chroma (e.g., Cb and Cr or U and V) components.

Once each of the color components of the 3D lookup table is partitioned into one or more octants, the techniques described in this disclosure may provide more efficient signaling of the color values of the 3D lookup table. The techniques include signaling, for each octant for each of the color components of the 3D lookup table, either values of vertexes of each of the octants or color mapping coefficients of a linear color mapping function for each of the octants. In this disclosure, the terms "partition," "octant," "segment," and "cuboid," may be used interchangeably to describe the partitioned regions of the color components of the 3D lookup table.

Color mapping coefficients may be converted or quantized from floating point values to integer values using a predefined number of bits. In some cases, the conversion or quantization information may be signaled in the bitstream. In other cases, the conversion or quantization information (i.e., the number of bits used to represent the value of 1) may be dependent on at least one of the input bit-depth or output bit-depth of the 3D lookup table.

Video encoder 20 and/or video decoder 30 may generate a 3D lookup table for color gamut scalability by performing joint partitioning of the first and second chroma components. In a conventional 3D lookup table, the luma, first chroma, and second chroma (i.e., Y, U, and V) components are independently partitioned. When each component is split into N segments or octants, the total number of octants may be N×N×N, which results in a large 3D lookup table. For example, table sizes may be up to 9×9×9 or 17×17×17. To reduce the number of octants, independent partitioning of the luma (i.e., Y) component while jointly partitioning the first and second chroma (i.e., U and V) components may be performed.

Video encoder 20 and/or video decoder 30 may generate a 3D lookup table for color gamut scalability with coarser partitioning for the first and second chroma (e.g., Cb and Cr or U and V) components and finer partitioning for the luma (e.g., Y) component. Video encoder 20 and/or video decoder 30 may generate this 3D lookup table by partitioning each of the color components into a number of octants according to a base partition value, e.g., a maximal split depth for the 3D lookup table, and then further partitioning each of the octants of the luma component based on a luma partition value. In one example, the luma partition value may be signaled in a bitstream by video encoder 20 to video decoder 30. In some cases, the base partition value may also be signaled in the bitstream by video encoder 20 to video decoder 30. In other cases, the luma partition value may be derived at both video encoder 20 and video decoder 30, and/or the base partition value may be a predefined value known at both the video encoder and the video decoder.

In one example, video encoder 20 and/or video decoder 30 first constructs the 3D lookup table in such a way that the each of the color components (i.e., the Y-U-V space) is iteratively and symmetrically split or partitioned until a predefined or signaled split depth is reached. The split depth defines a maximum number of times all of the color components of the 3D lookup table may be partitioned. In this way, the base partition value may be defined as a split depth. Then video encoder 20 and/or video decoder 30 further evenly, or not evenly, splits each smallest cube or octant along the luma (i.e., Y) direction so that the luma (i.e., Y) component has finer partitioning while the chroma (i.e., U and V) components have coarser partitioning.

In one example described above, for each of the octants or partitions, video encoder 20 may signal the color mapping coefficients of the linear color mapping function of the color values in the 3D lookup table. The linear color mapping function is used to convert color data in a first color gamut for a lower layer of video data to a second color gamut for a higher layer of video data, and the color mapping coefficients are weighting factors between color components of the lower and higher layers of the video data. For each of the color components, one of the color mapping coefficients may be a key coefficient that defines a weighting factor between the same color component of the lower and higher layers of the video data.

After video encoder 20 and/or video decoder 30 generate the 3D lookup table using one or more the example techniques described above, color prediction may be performed as follows using the 3D lookup table. The input to the color prediction process is a (y,u,v) triplet in one color space, e.g., a first color gamut for a lower or base layer of video data. The output of the color prediction process is a triplet (Y,U,V) in another color space, e.g., a second color gamut for a higher or enhancement layer of video data. The smallest octant or cuboid that covers the input triplet (y,u,v) is located in the 3D lookup table.

Next generation video applications are anticipated to operate with video data representing captured scenery with HDR and a wide color gamut (WCG). Parameters of the utilized dynamic range and color gamut are two independent attributes of video content, and their specification for purposes of digital television and multimedia services are defined by several international standards. For example, ITU-R Rec. BT.709, "Parameter values for the HDTV standards for production and international programme exchange," defines parameters for high definition television (HDTV), such as standard dynamic range (SDR) and standard color gamut, and ITU-R Rec. BT.2020, "Parameter values for ultra-high definition television systems for production and international programme exchange," specifies ultra-HDRV (UHDTV) parameters such as HDR and WCG. There are also other standards developing organization (SDOs) documents that specify dynamic range and color gamut attributes in other systems, e.g., DCI-P3 color gamut is defined in SMPTE-231-2 (Society of Motion Picture and Television Engineers) and some parameters of HDR are defined in SMPTE-2084. A brief description of dynamic range and color gamut for video data is provided below.

Dynamic range is typically defined as the ratio between the minimum and maximum brightness (e.g., luma) of the video signal. Dynamic range may also be measured in terms of 'f-stop,' where one f-stop corresponds to a doubling of a signal's dynamic range. In MPEG's definition, HDR content is content that features brightness variation with more than 16 f-stops. In some terms, levels between 10 and 16 f-stops are considered as intermediate dynamic range, but it is considered HDR in other definitions. In some examples of this disclosure, HDR video content may be any video content that has a higher dynamic range than traditionally used video content with a standard dynamic range (e.g., video content as specified by ITU-R Rec. BT.709).

Figure 10:
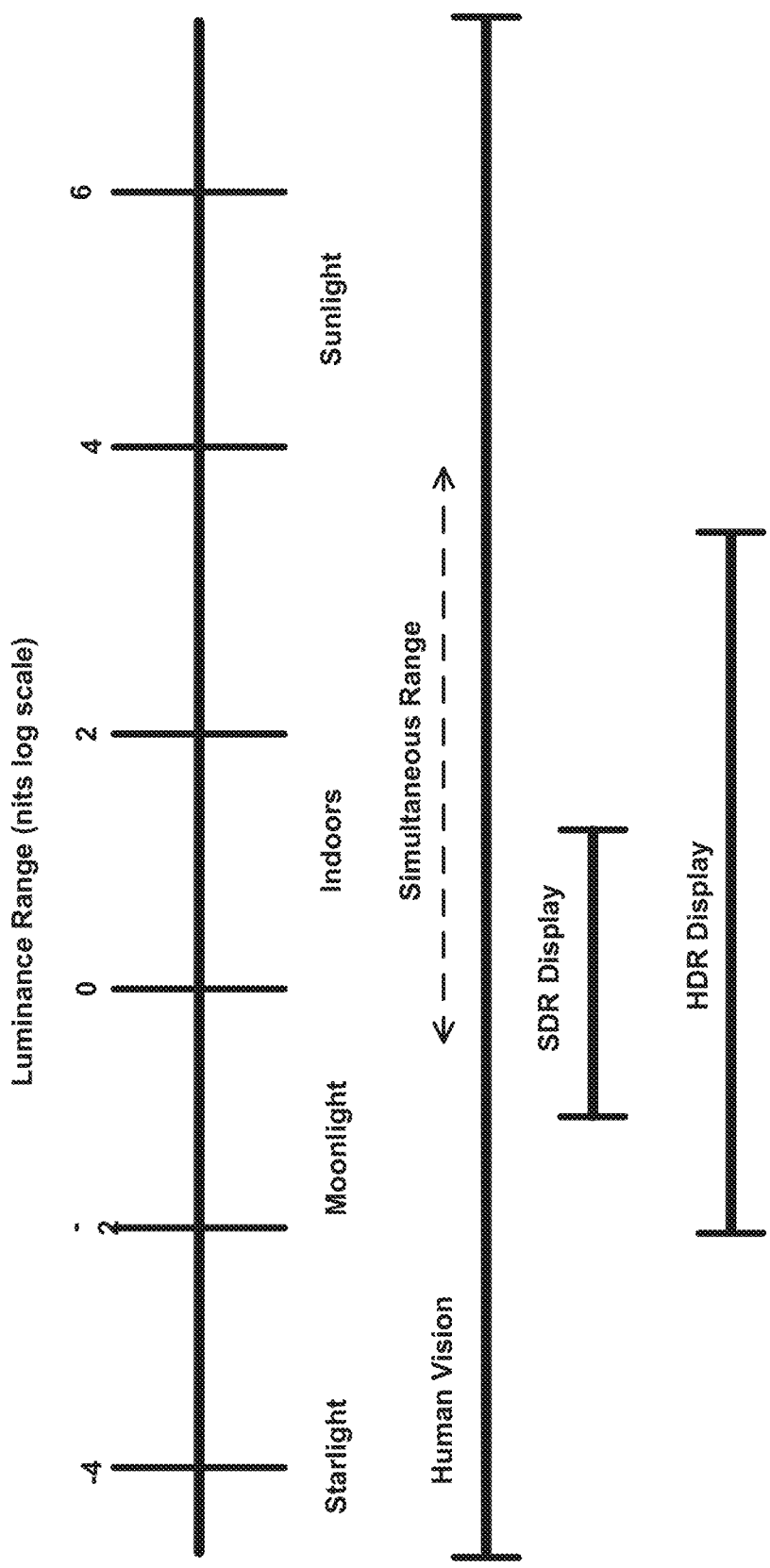
FIG. 10 is a conceptual drawing illustrating example concepts of HDR data.

The human visual system (HVS) is capable for perceiving much larger dynamic ranges than SDR content and HDR content. However, the HVS includes an adaptation mechanism to narrow the dynamic range of the HVS to a so-called simultaneous range. The width of the simultaneous range may be dependent on current lighting conditions (e.g., current brightness). Visualization of dynamic range provided by SDR of HDTV, expected HDR of UHDTV and HVS dynamic range is shown in FIG. 10.

Current video application and services are regulated by ITU Rec.709 and provide SDR, typically supporting a range of brightness (e.g., luma) of around 0.1 to 100 candelas (cd) per m2 (often referred to as "nits"), leading to less than 10 f-stops. Some example next generation video services are expected to provide dynamic range of up to 16 f-stops. Although detailed specifications for such content are currently under development, some initial parameters have been specified in SMPTE-2084 and ITU-R Rec. 2020. "Call for Evidence (CfE) for HDR and WCG Video Coding", MPEG document M36131, Switzerland, Feb. 2015 describes an example of dual-layer coding mechanism for HDR, providing background compatibility.

Figure 11:
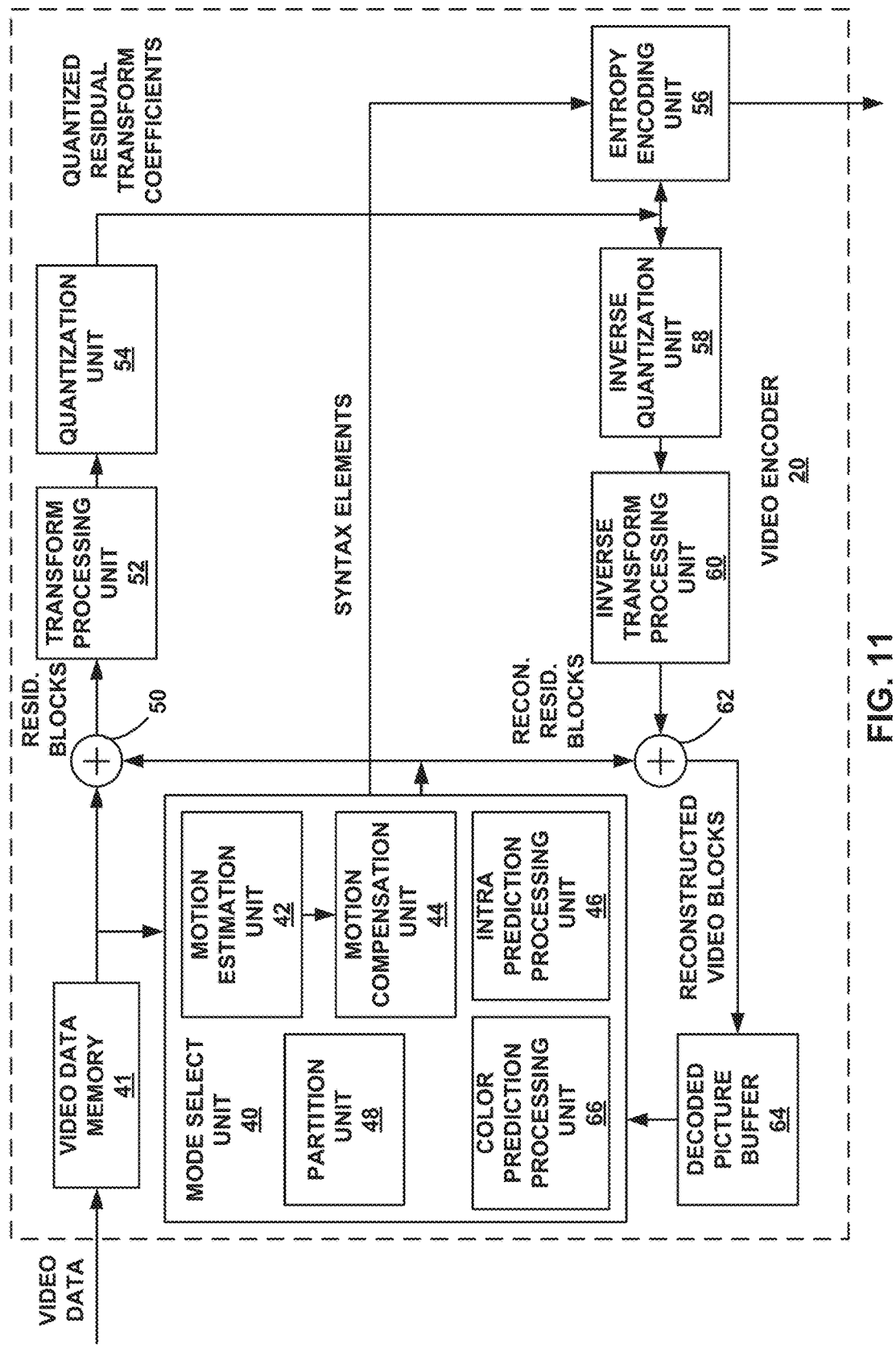
FIG. 11 is a block diagram illustrating an example video encoder that may implement techniques for identifying and eliminating artifacts when using color gamut scalability in multi-layer video coding.

FIG. 11 is a block diagram illustrating an example of video encoder 20 that may implement techniques for identifying and eliminating artifacts when using color gamut scalability in multi-layer video coding. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 11, video encoder 20 receives a current video block within a video frame to be encoded. In the example of FIG. 11, video encoder 20 includes mode select unit 40, a video data memory 41, decoded picture buffer 64, summer 50, transform processing unit 52, quantization unit 54, and entropy encoding unit 56. Mode select unit 40, in turn, includes motion compensation unit 44, motion estimation unit 42, intra-prediction unit 46, partition unit 48, and color prediction processing unit 66. For video block reconstruction, video encoder 20 also includes inverse quantization unit 58, inverse transform processing unit 60, and summer 62. A deblocking filter (not shown in FIG. 11) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAIVI), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Mode select unit 40 may select inter-layer prediction as a coding mode. Inter-layer prediction allows reconstruction of a block based on data in a different layer (e.g., a base layer or enhancement layer). With the use of color gamut scalability, a lower layer of video data may include color data in a first color gamut, e.g., a BT.709 color container, and a higher layer of the video data may include color data in a different, second color gamut, e.g., in an ultra-high definition (UHD) color gamut BT.2020 color container. When inter-layer prediction is performed, color values may be translated between color gamuts. Three dimensional CGS mapping tables may be derived by mode select unit 40 (via, e.g., color prediction processing unit 66 ) and the derivation is performed for each partition of pixel values in a color space (e.g., a YUV domain). The pixel color domain (i.e., a three dimensional (3D) domain of YUV or XYZ tristimulus values that specify a specific color given a specific color container) may be split by mode select unit 40 (via e.g., color prediction processing unit 66) into rectangular cuboids. CGS parameters are obtained by independently optimizing each rectangular cuboid which can cause mapping anomalies in color mappings at the boundaries of the rectangular cuboids which can cause artifacts in the reconstructed video. According to techniques of the present disclosure, potential artifacts are identified. Where such artifacts are identified, inter-layer prediction may be disabled so as not to create artifacts in the reconstructed video block.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

According to the techniques described in this disclosure, video encoder 20 is configured to perform 3D lookup table based color gamut scalability when encoding multi-layer video data. Video encoder 20 may predict and encode multi-layer video data in accordance any of the SHVC extension, the MV-HEVC extension, and the 3D-HEVC extension, or other multi-layer video coding extensions. Specifically, color prediction processing unit 66 of video encoder 20 may generate inter-layer reference pictures used to predict video blocks in a picture of a higher layer of the video data when a color gamut for the higher layer of the video data is different than a color gamut for a lower layer of video data.

Color prediction processing unit 66 of video encoder 20 may perform color prediction using a 3D lookup table for color gamut scalability to convert color data of a reference picture in a first color gamut for the lower layer of the video data to a second color gamut for the higher layer of the video data. In some examples, color prediction processing unit 66 may generate a separate 3D lookup table for each of the color components, i.e., a luma component, a first chroma component and a second chroma component. Each of the 3D lookup tables includes a luma dimension, a first chroma dimension and a second chroma dimension, and is indexed using the three independent color components.

Video encoder 20 may generate a 3D lookup table based on a number of octants for each of the luma, first chroma, and second chroma color components, and color values for each of the octants. As described above, in some cases, video encoder 20 may encode at least one syntax element indicating the number of octants for at least one of the color components of the 3D lookup table. Video encoder 20 may also encode the color values for each of the octants for each of the color components. For example, video encoder 20 may encode color mapping coefficients for a linear color mapping function of the color values in the 3D lookup table. The linear color mapping function is used to convert color data in the first color gamut for the lower layer of video data to the second color gamut for the higher layer of video data. The color mapping coefficients for the linear color mapping function are weighting factors between color components of the lower and higher layers of the video data. For each of the color components, one of the color mapping coefficients may be a key coefficient that defines a weighting factor between the same color component of the lower and higher layers of the video data.

The color mapping coefficients for the linear color mapping function may be derived as floating point values. Prior to encoding the color mapping coefficients, color prediction processing unit 66 of video encoder 20 may convert the floating point values of the color mapping coefficients to integer values. The conversion may use a bit-depth for the integer values based on at least one of an input bit-depth or an output bit-depth of the 3D lookup table. In addition, color prediction processing unit 66 may restrict the values of the color mapping coefficients to be within a given range based on a predefined fixed value or a value dependent on at least one of an input bit-depth or an output bit-depth of the 3D lookup table.

In some examples of the techniques of this disclosure, color prediction processing unit 66 may predict one or more of the color mapping coefficients in order to encode residual values between original values of the color mapping coefficients and the predicted values of the color mapping coefficients. For example, for a first octant for each of the color components, color prediction processing unit 66 may predict the color mapping coefficients of the linear color mapping function based on predefined fixed values. In one example, for a first octant for each of the color components, color prediction processing unit 66 may encode a key coefficient of the linear color mapping function based on a predicted value equal to a predefined non-zero value, and encode any remaining color mapping coefficients of the linear color mapping function based on a predicted value equal to zero. In this example, color prediction processing unit 66 may encode the color mapping coefficients of any remaining octants for each of the color components based on predicted values from at least one previously encoded octant, such as the first octant.

Entropy encoding unit 56 of video encoder 20 may then entropy encode the residual values of the color mapping coefficients for the linear color mapping function for each of the octants for each of the color components. In some cases, prior to entropy encoding, video encoder 20 may quantize the residual values of the color mapping coefficients using quantization unit 54 based on a determined quantization value. Video encoder 20 may encode the determined quantization value.

Upon generating the 3D lookup table, color prediction processing unit 66 performs color prediction of a reference picture for the lower layer of the video data using the 3D lookup table, and generates at least one inter-layer reference picture for the higher layer of the video data based on the color predicted reference picture. Upon generating the inter-layer reference picture, motion compensation unit 44 of video encoder 20 may operate as described above to predict video blocks in a picture of the higher layer of the video data based on the inter-layer reference pictures generated using the 3D lookup table. Video encoder 20 may then encode residual data of the video blocks in a bitstream for transmission to video decoder 30.

Figure 12:
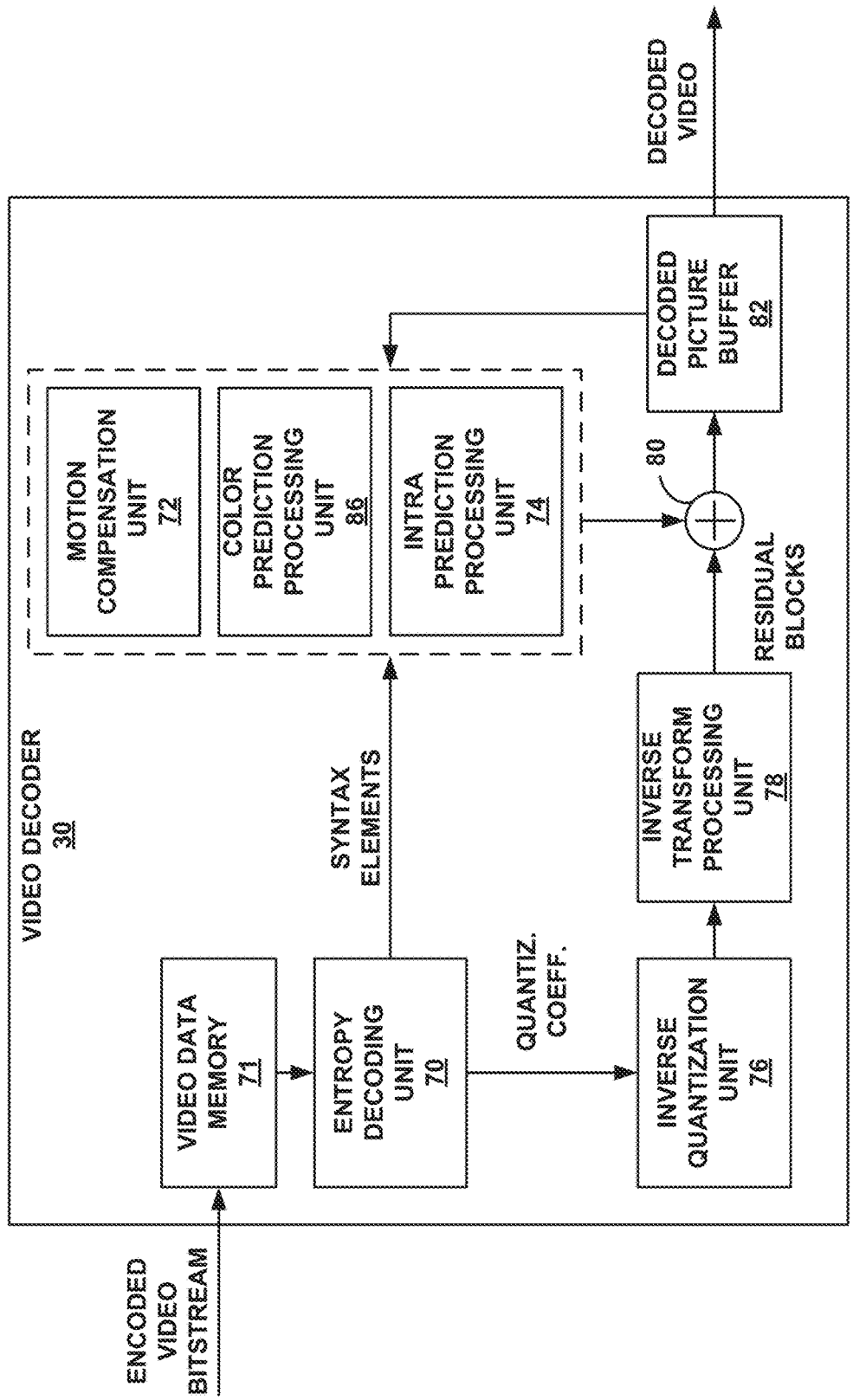
FIG. 12 is a block diagram illustrating an example of a video decoder that may implement techniques for identifying and eliminating artifacts when using color gamut scalability in multi-layer video coding.

FIG. 12 is a block diagram illustrating an example of video decoder 30 that may implement techniques for identifying and eliminating artifacts when using color gamut scalability in multi-layer video coding. In the example of FIG. 12, video decoder 30 includes an entropy decoding unit 70, a video data memory 71, motion compensation unit 72, intra prediction processing unit 74, color prediction processing unit 86, inverse quantization unit 76, inverse transform processing unit 78, decoded picture buffer 82 and summer 80. Video decoder 30 may, in some examples, perform a decoding pass generally reciprocal to the encoding pass described with respect to video encoder 20 (FIG. 11). Motion compensation unit 72 may generate prediction data based on motion vectors received from entropy decoding unit 70, while intra prediction processing unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter QPy calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

According to some examples of the techniques described in this disclosure, video decoder 30 is configured to perform 3D lookup table based color gamut scalability when decoding multi-layer video data. Video decoder 30 may decode and reconstruct predicted multi-layer video data in accordance any of the SHVC extension, the MV-HEVC extension, the 3D-HEVC extension, or other multi-layer video coding extensions to HEVC. Specifically, color prediction processing unit 86 of video decoder 30 may generate inter-layer reference pictures used to predict video blocks in a picture of a higher layer of the video data when a color gamut for the higher layer of the video data is different than a color gamut for a lower layer of video data.

Color prediction processing unit 86 of video decoder 30 may perform color prediction using a 3D lookup table for color gamut scalability to convert color data of a reference picture in a first color gamut for the lower layer of the video data to a second color gamut for the higher layer of the video data. In some examples, color prediction processing unit 86 may generate a separate 3D lookup table for each of the color components, i.e., a luma component, a first chroma component and a second chroma component. Each of the 3D lookup tables includes a luma dimension, a first chroma dimension and a second chroma dimension, and is indexed using the three independent color components.

The techniques of this disclosure relate to signaling of the information used to generate 3D lookup tables for color gamut scalability. According to the techniques, video decoder 30 may decode partition information and/or color values to generate a 3D lookup table in order to perform color gamut scalability. The techniques described in this disclosure may be particularly useful in detecting potential artifacts in enhancement frame pictures/blocks where inter-layer prediction is utilized.

Color prediction processing unit 86 of video decoder 30 may generate a 3D lookup table with coarser partitioning for the first and second chroma components and finer partitioning for the luma component. Color prediction processing unit 86 may generate this 3D lookup table by partitioning each of the first chroma, second chroma, and luma color components into a first number of octants according to a base partition value, e.g., a maximal split depth for the 3D lookup table, and then further partitioning each of the first number of octants of the luma component based on a luma partition value. In this way, each of the first and second chroma components of the 3D lookup table are partitioned into fewer octants (i.e., coarser partitioned) and the luma component of the 3D lookup table is partitioned into more octants (i.e., finer partitioned).

In some cases, entropy decoding unit 70 of video decoder 30 entropy decodes at least one syntax element (e.g., a first syntax element) indicating the luma partition value. In other cases, the luma partition value may be derived or known at both video encoder 20 and video decoder 30. As one example, color prediction processing unit 86 may derive the luma partition value based at least in part on the base partition value. In some cases, entropy decoding unit 70 may also decode at least one syntax element (e.g., a second syntax element) indicating the base partition value. In other cases, the base partition value may be a predefined value known at both video encoder 20 and video decoder 30. Color prediction processing unit 86 uses the predefined or signaled base partition value and the derived or signaled luma partition value to generate the 3D lookup table with coarser partitioning for the first and second chroma components and finer partitioning for the luma component, as described above.

In addition, video decoder 30 may conditionally decode one or more syntax elements indicating a partitioning boundary for at least one of the chroma components. The partitioning boundary defines an uneven partitioning of the one of the chroma components into two or more octants. According to the techniques of this disclosure, video decoder 30 only decodes the syntax elements indicating the partitioning boundary when at least one of the chroma components is partitioned into more than one octant, i.e., when the base partition value is greater than one. Otherwise, decoding the partition boundary is unnecessary.

In another example of the disclosed techniques, video decoder 30 may generate a 3D lookup table based on a number of octants for each of the luma, first chroma, and second chroma color components, and color values for each of the octants. As described above, in some cases, video decoder 30 may decode at least one syntax element indicating the number of octants for at least one of the color components of the 3D lookup table, or otherwise determine the number of octants for each of the color components of the 3D lookup table. Video decoder 30 may also decode the color values for each of the octants for each of the color components. For example, video decoder 30 may decode color mapping coefficients for a linear color mapping function of the color values in the 3D lookup table. The linear color mapping function is used to convert color data in the first color gamut for the lower layer of video data to the second color gamut for the higher layer of video data. The color mapping coefficients for the linear color mapping function are weighting factors between color components of the lower and higher layers of the video data. For each of the color components, one of the color mapping coefficients may be a key coefficient that defines a weighting factor between the same color component of the lower and higher layers of the video data.

The color mapping coefficients for the linear color mapping function are first derived as floating point values. The floating point values are then converted or quantized to integer values are signaled as integer values. The conversion may use a bit-depth for the integer values based on at least one of an input bit-depth or an output bit-depth of the 3D lookup table. In addition, color prediction processing unit 86 may restrict the values of the color mapping coefficients to be within a given range based on a predefined fixed value or a value dependent on at least one of an input bit-depth or an output bit-depth of the 3D lookup table.

Entropy decoding unit 70 of video decoder 30 may entropy decode residual values of the color mapping coefficients for the linear color mapping function for each of the octants for each of the color components. In some cases, after entropy decoding and prior to reconstruction, video decoder 30 may inverse quantize the residual values of the color mapping coefficients using inverse quantization unit 76 based on a determined quantization value. Video decoder 30 may decode a syntax element indicating the determined quantization value.

According to the techniques of this disclosure, color prediction processing unit 86 may predict one or more of the color mapping coefficients in order to reconstruct values of the color mapping coefficients based on the residual values of the color mapping coefficients and the predicted values of the color mapping coefficients. For example, for a first octant for each of the color components, color prediction processing unit 86 may predict the color mapping coefficients of the linear color mapping function based on predefined fixed values. In one example, for a first octant for each of the color components, color prediction processing unit 86 may decode a key coefficient of the linear color mapping function based on a predicted value equal to a predefined non-zero value, and decode any remaining color mapping coefficients of the linear color mapping function based on a predicted value equal to zero. In this example, color prediction processing unit 86 may decode the color mapping coefficients of any remaining octants for each of the color components based on predicted values from at least one previously decoded octant, such as the first octant.

Upon generating the 3D lookup table, color prediction processing unit 86 performs color prediction of a reference picture for the lower layer of the video data using the 3D lookup table, and generates an inter-layer reference picture for the higher layer of the video data based on the color predicted reference picture. Upon generating the inter-layer reference pictures, motion compensation unit 72 of video decoder 30 may operate as described above to reconstruct video blocks in a picture of the higher layer of the video data based on decoded residual data and the inter-layer reference pictures generated using the 3D lookup table.

Figure 13:
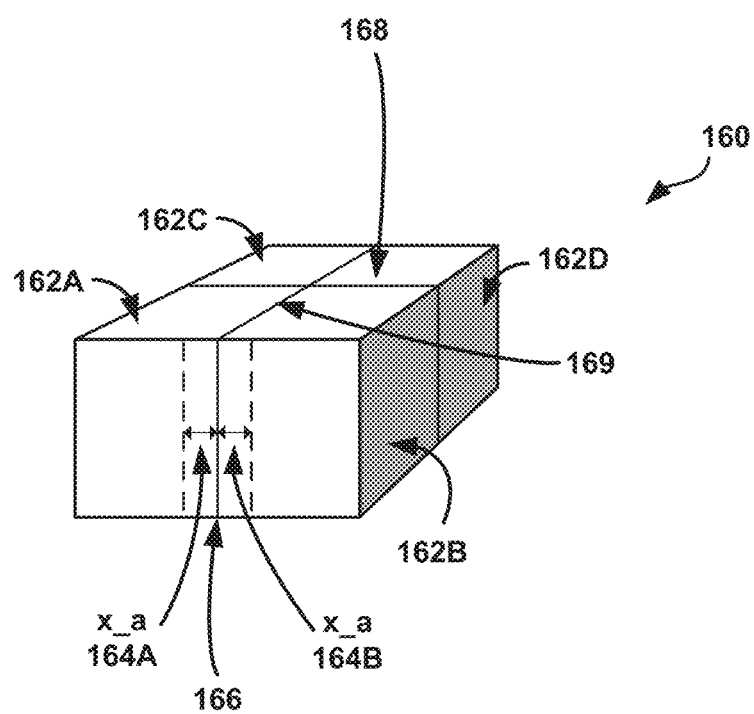
FIG. 13 is a conceptual illustration showing rectangular cuboid partitions of a color space.

FIG. 13 is a conceptual illustration showing rectangular cuboid partitions of a color space according to techniques of the present disclosure. Pixel value domain 160 is partitioned into rectangular cuboid partitions 162A-D (collectively rectangular cuboids 162). The pixel value domain may include any pixel value domain including YUV and YCbCr. Each rectangular cuboid partition 162A-D is optimized independently by video encoder 20. As each rectangular cuboid partition 162A-D is optimized independently, two-pixel color values that belong to two adjacent partitions (e.g., 162A and 162B; 162A and 162C) and have a very small value difference between each other (e.g., a small distance in FIG. 13) may have a relatively larger difference in the mapped values for the two pixel values. If video encoder 20 were to use inter-layer prediction references for enhancement layer picture/blocks, some artifacts may appear in certain frames of the sequences. These artifacts typically appear like contouring artifacts and are typically most prominent where the enhancement layer (EL) is HDR data and the base layer (BL) is SDR data that is manually graded from the HDR content.

Blocks (within the video sequence) that potentially contain artifacts are detected by video encoder 20. Video encoder 20 may test some or all of the pixels within the video blocks of a video sequence for potentially containing artifacts. For any partition boundary 166, 168, and 169, threshold pixel value 164, x_a, (individually threshold pixel value 164A and 164B) is defined and all pixel values that fall within the threshold pixel value 164 of the partition boundary 166 are collected in a list. The list may be used to flag certain blocks contain pixel values within the threshold pixel value 164. In one example, for each partition boundary 166, 168, and 169 the pixels in the rectangular cuboids 162 are stored separately. In another example, the pixels are collected for all partition boundaries 166, 168, 169 in all three components (i.e., luma and two chroma values). In another example, the pixel values are only collected for partition boundaries 166 along the luma axis. If a luma partition occurs between pixel values 127 and 128 and threshold pixel value 164 is 4, then all pixels that belong to the first partition 162A and have luma values in the range [124, 127] are collected in the first list, and all pixels in the second partition 162B and have luma values in the range [128, 131] are collected in the second list. In a further example, different threshold values 164A and 164B could be used for rectangular cuboid partitions 162A, 162B that share partition boundary 166.

Inter-layer prediction (e.g., CU-level merge, PU-level merge, skip modes, residual prediction related to the inter-layer prediction candidate) may be disabled for those blocks (CU/PU) that were identified as potentially containing artifacts.

Figure 14:
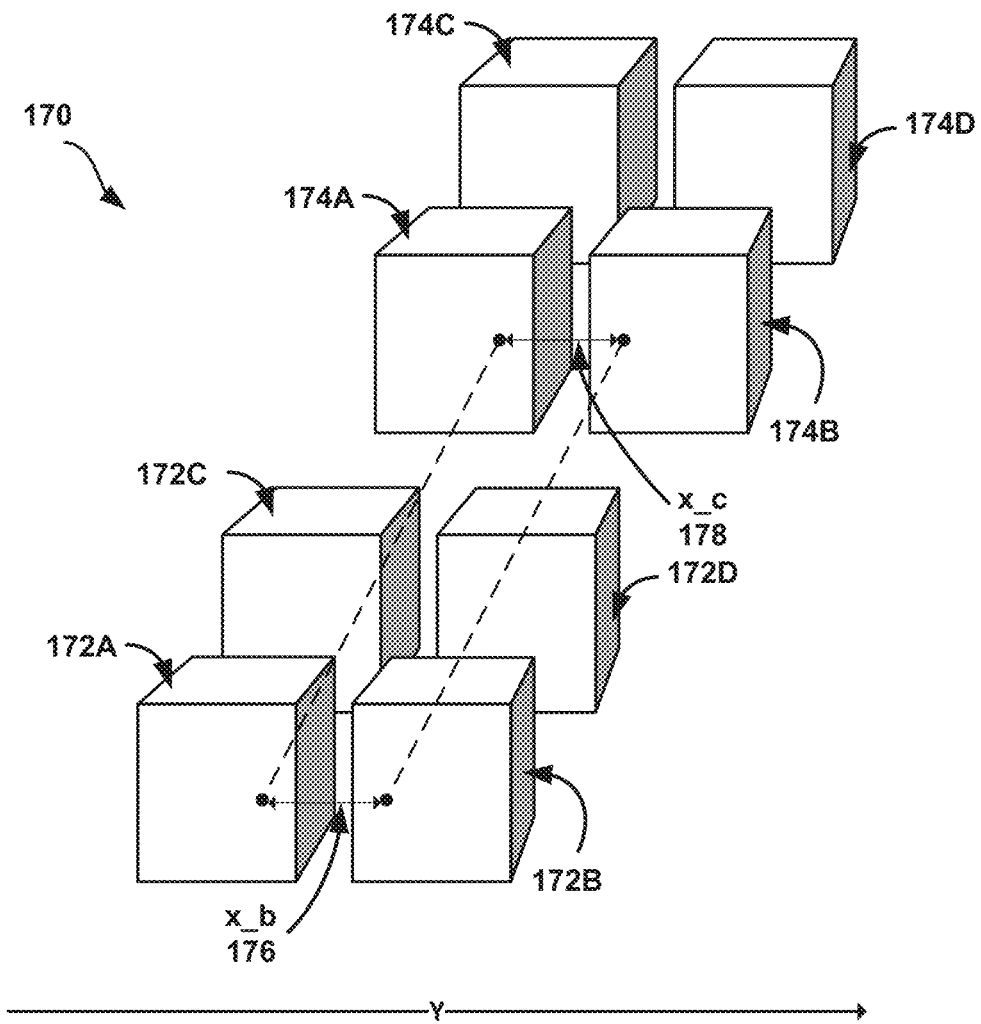
FIG. 14 is a conceptual illustration showing rectangular cuboid partitions of a color space of a base layer and an enhancement layer.

FIG. 14 is a conceptual illustration showing rectangular cuboid partitions of a color space of a base layer and an enhancement layer according to techniques of the present disclosure. Base layer partitions 172A-D are mapped, by video encoder 20, to enhancement layer partitions 174A-D for a single component (e.g., luma or chroma). As described with respect to FIG. 13, two lists may be created with pixel values (from a video block) within threshold x_a 164, one list for each of adjacent partitions. Threshold x_b 176 and threshold x_c 178 are defined for each combination of component pixel values from the two lists. For example, a value k1 from the first list and a value k2 from the second list. A pixel value difference check of two comparisons are made between k1 and k2 and the mapped values of k1 and k2. The first comparison is hether the difference between k1 and k2 does not exceed threshold x_b 176 (i.e. k2|<x_b) which indicates that the pixel value differences in the base layer domain (partitions 172) is relatively small. The second comparison is whether the difference between the mapped values of k1 (k1') and k2 (k2'), using the respective CGS tables for each partition) exceeds threshold x_c 178 (i.e., x_c) which indicates that the pixel value differences in the enhancement layer domain (partitions 174) is relatively large. If both comparisons are true, then the block is marked as potentially containing artifacts.

In an example, one or more pairs of threshold values x_b 176 and x_c 178 are defined and the pixel value difference check is performed for each pair of thresholds. The block under test by the video encoder 20 is marked as potentially containing artifacts if a subset of the checks (or all of the checks) are satisfied. For example, one pair of threshold values (for threshold x_b 176 and threshold x_c 178) can be applied to detect relatively larger differences and another pair can be applied to detect relatively smaller changes. The pixel value difference check may use a smaller threshold, e.g., threshold x_b 176, when comparing base layer pixel value differences. The pixel value difference check may use a larger threshold, e.g., threshold x_c 178, for the CGS mapped base layer pixel value differences. When pixel differences of the base layer pixel values in the block is less than a first (smaller) threshold, and pixel value differences in the enhancement layer are greater than a second (larger) threshold, an artifact may be visible if inter-layer prediction were used.

In a further example, a certain threshold number of pixel value pairs t is defined such that only when the number of pairs that satisfy the pixel value difference check is greater than t, the block is marked as potentially containing artifacts. In another example, the pixel value difference check is only performed for a subset of the partition boundaries (between partitions 172A-D; 174A-D). For example, artifacts in the luma values in the middle range [256, 384] are relatively more visible which would mean that encoding time could be reduced if fewer checks are made while having most of the benefits of fewer visible artifacts. In another example, the pixel value difference check for a pair of threshold values x_b 176 and x_c 178 when the variance of the pixel values of the blocks does not exceed a certain threshold.

Figure 15:
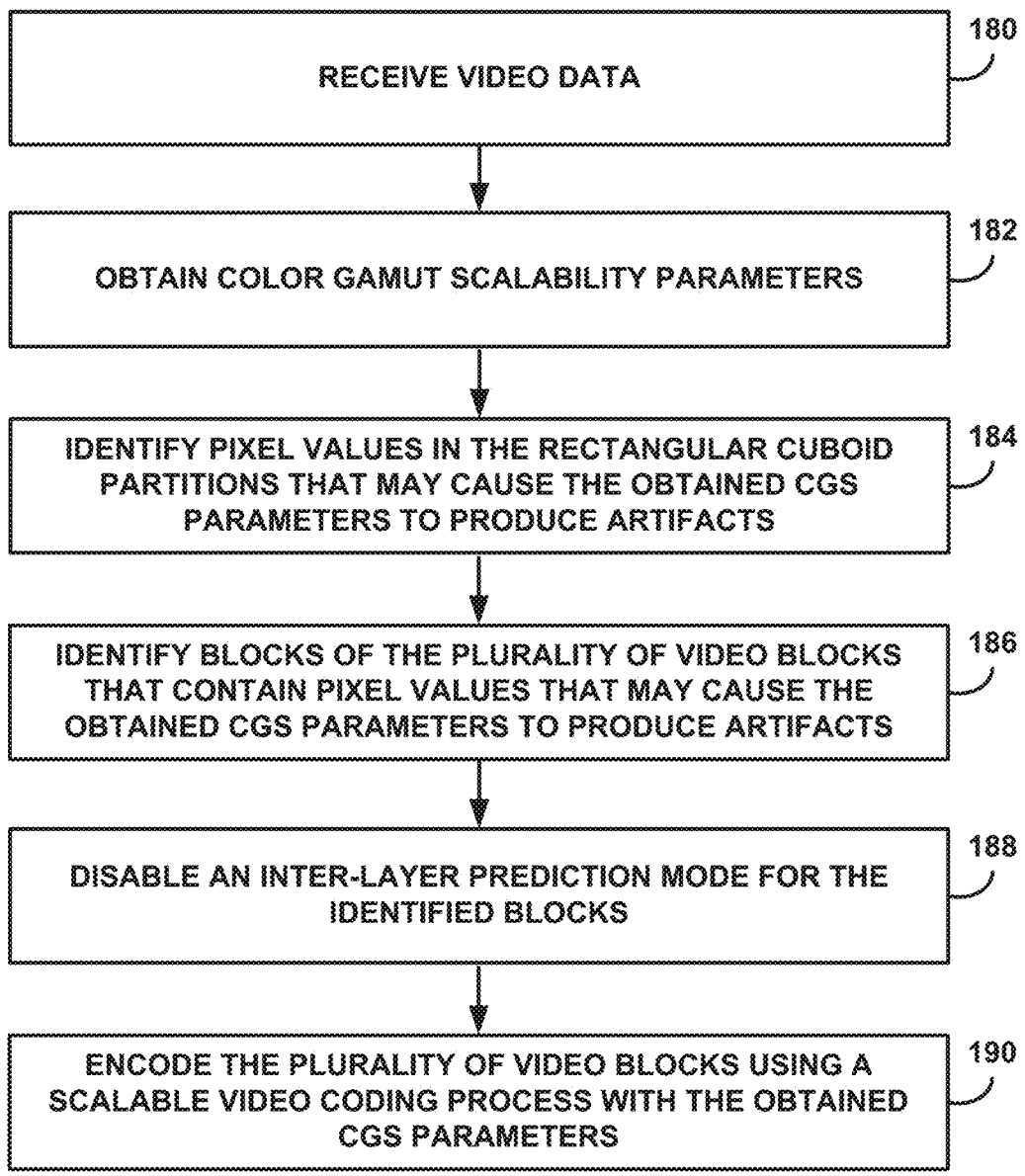
FIG. 15 is a flowchart illustrating an example operation of encoding video data.

FIG. 15 is a flowchart illustrating an example operation of encoding video data. The example operation of FIG. 15 is described herein as being performed by video encoder 20 of FIG. 11.

According to the techniques of this disclosure, video encoder 20 may receive video data comprising a plurality of video blocks (180). The plurality of video blocks comprising a plurality of pixel values in a color space. Video encoder 20 may obtain color gamut scalability (CGS) parameters (182). Obtaining CGS parameters may include splitting the color space into a plurality of rectangular cuboid partitions, each of the plurality of rectangular cuboid partitions comprising at least one partition boundary between the plurality of rectangular cuboid partitions. Obtaining CGS parameters may include generating a three dimensional lookup table based on the plurality of rectangular cuboid partitions for each color component, minimizing a mean squared value between pixels belonging to each of the plurality of rectangular cuboid partitions.

Video encoder 20 may identify pixel values in the rectangular cuboid partitions that comprise characteristics that may cause the obtained CGS parameters to produce artifacts when decoding the plurality of video blocks (184). Characteristics that may cause CGS parameters to produce artifacts include pairs of pixels in adjacent rectangular cuboid partitions with small value differences where the mapped values of the pair of pixels have large value differences. The small value difference and large value difference may be determined based on one or more threshold values.

Video encoder 20 may then identify blocks of the plurality of video blocks that contain the pixel values that may cause the obtained CGS parameters to produce artifacts when decoding the plurality of video blocks (186). Video encoder 20 may disable an inter-layer prediction mode for the identified blocks (188). Video encoder 20 may encode the plurality of video blocks using a scalable video coding process with the obtained CGS parameters (190). Encoding the plurality of video blocks may include, for each of the plurality of rectangular cuboid partitions, encoding CGS parameters for a linear color mapping function of color values in the three dimensional lookup table. The encoding, by video encoder 20 may use an enabled prediction mode.

A scalable video coding process may include the encoding of a video bitstream that contains one or more subset bitstreams with varying layers of quality. For example, a base layer with a lowest spatial and quality layer and an enhancement layer with a higher spatial and/or quality layer. Bitstreams encoded via a scalable video coding process may include coded pictures or slices in the same time instance that are successive in the bitstream order and form one access unit in the context of a scalable video coding standard, such as the SVC extension to H.264 or SHVC. The access units may then follow the decoding order, which may be different from the display order and determined, for example, by the temporal prediction relationship between access units.

Figure 16:
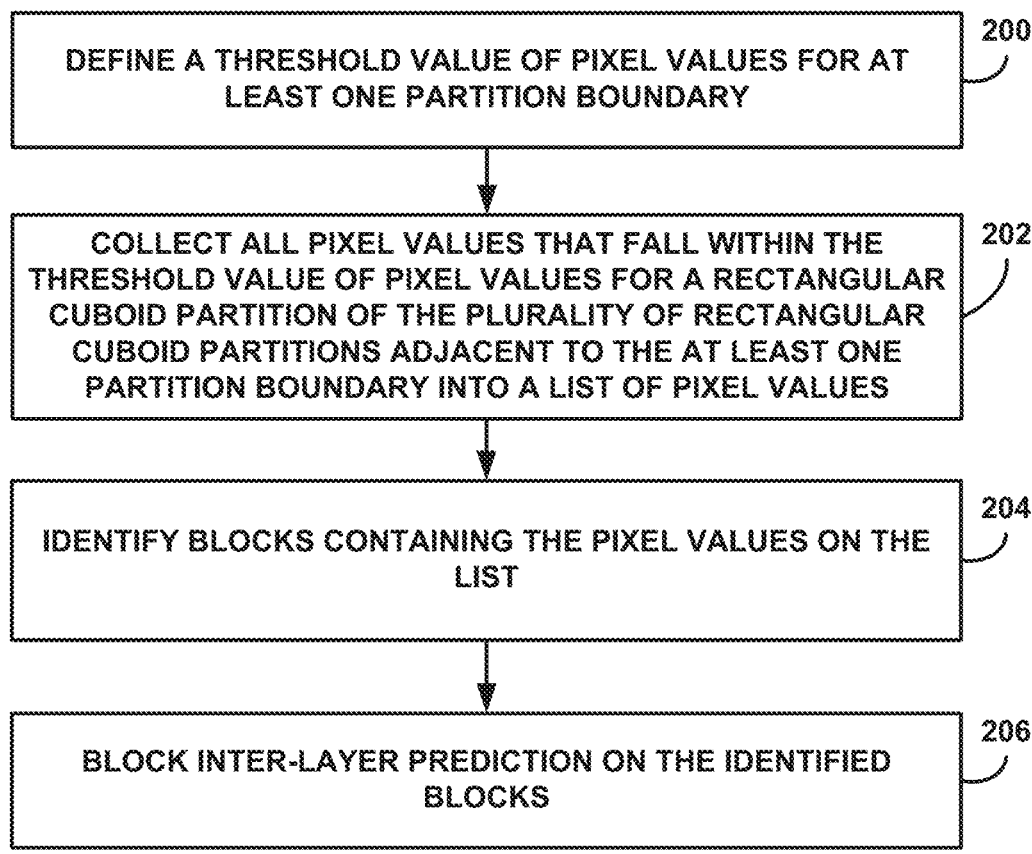
FIG. 16 is a flowchart illustrating an example operation of identifying and reducing artifacts in encoded video.

FIG. 16 is a flowchart illustrating an example operation of identifying and reducing artifacts in encoded video. The example operation of FIG. 16 is described herein as being performed by a video encoder 20 of FIG. 11.

According to the techniques of this disclosure, video encoder 20 may define a threshold value of pixel values for at least one partition boundary (200). Video encoder 20 may collect all pixel values that fall within the threshold value of pixel values for a rectangular cuboid partition of the plurality of rectangular cuboid partitions adjacent to the at least one partition boundary into a list of pixel values (202). Video encoder 20 may identify blocks containing the pixel values on the list (204). Video encoder 20 may block inter-layer prediction on the identified blocks (206).

Furthermore, video encoder 20 may collect pixel information for all partition boundaries on all color components (e.g., luma and chroma values). Video encoder 20 may also collect pixels for portions of the partition boundaries (e.g., a portion of the luma axis). For example, if the luma partition occurs between pixel values 127 and 128, and the threshold value is 4, then all pixels that belong in the first partition have luma values in the range [124, 127] and are collected on a first list and all pixels that belong in the second partition have luma values in the range [128, 131] and are collected in a second list. In a further example, different threshold values may be used for the partitions that share the partition boundary.

Figure 17:
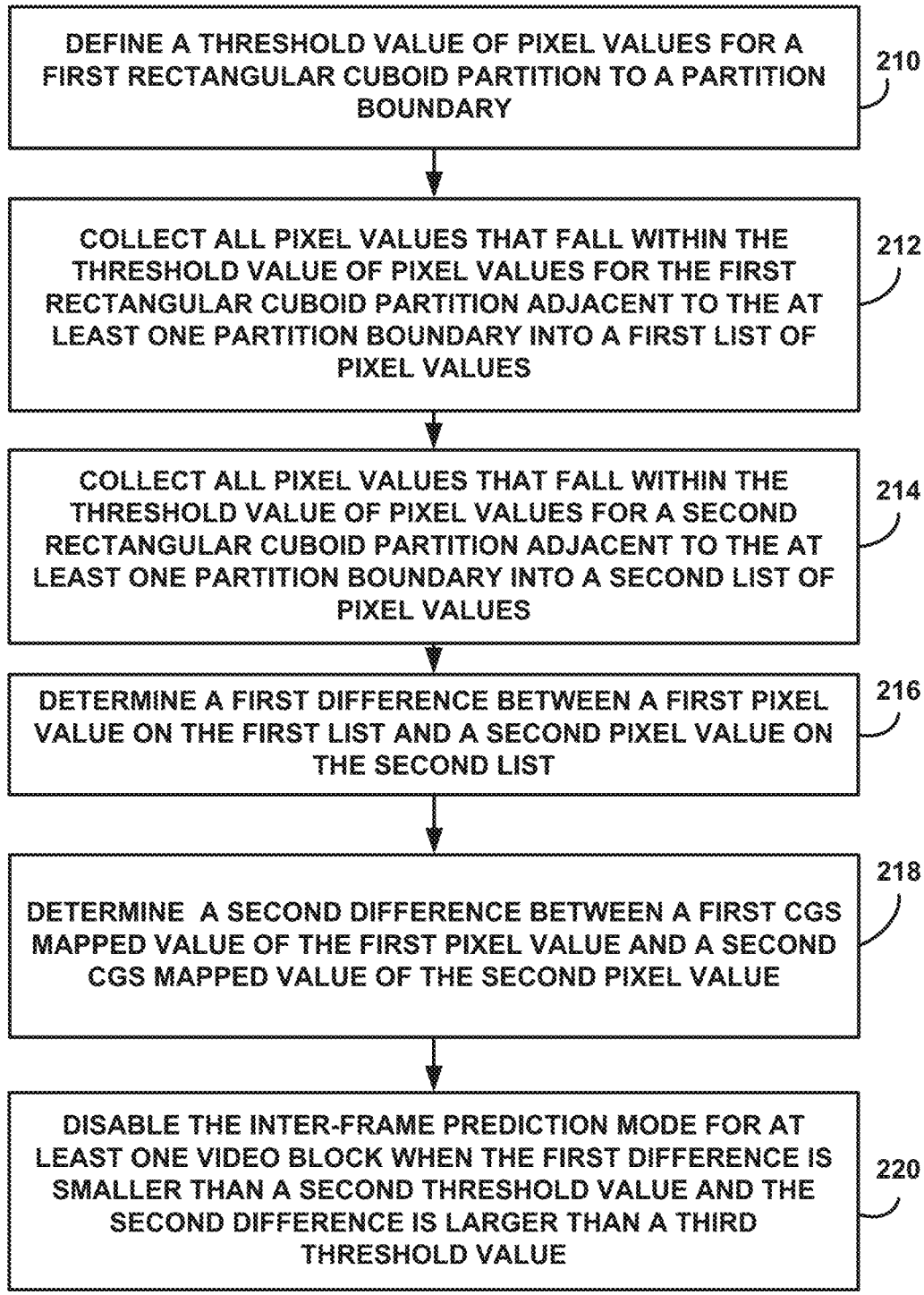
FIG. 17 is a flowchart illustrating an example operation of identifying and reducing artifacts in encoded video.

FIG. 17 is a flowchart illustrating an example operation of identifying and reducing artifacts in encoded video. The example operation of FIG. 17 is described herein as being performed by a video encoder 20 of FIG. 11.

According to the techniques of this disclosure, video encoder 20 may define a threshold value of pixel values for a first rectangular cuboid partition to a partition boundary (210). Video encoder 20 may collect all pixel values that fall within the threshold value of pixel values for the first rectangular cuboid partition adjacent to the at least one partition boundary into a first list of pixel values (212).

Video encoder 20 may collect all pixel values that fall within the threshold value of pixel values for a second rectangular cuboid partition adjacent to the at least one partition boundary into a second list of pixel values (214). Video encoder 20 may determine a first difference between a first pixel value on the first list and a second pixel value on the second list (216). Video encoder 20 may determine a second difference between a first CGS mapped value of the first pixel value and a second CGS mapped value of the second pixel value (218). Video encoder 20 may then disable the inter-layer prediction mode for at least one video block when the first difference is smaller than a second threshold value and the second difference is larger than a third threshold value.

Furthermore, video encoder 20 may define one or more pairs of thresholds (x_b and x_c) and a pixel value difference check is performed for each pair of thresholds. Video encoder 20 may mark the block as potentially containing artifacts when a subset of the checks, or in other examples all of the checks, are satisfied. For example, one pair of threshold values can be applied to detect a relatively larger difference (where, e.g., x_b and x_c are relatively larger) and another pair of threshold values can be applied to detect relatively smaller changes (where, e.g., x_b and x_c are relatively smaller). In another example, a threshold number of pixel value pairs t is defined such that only when the number of pairs that satisfy the above pixel condition check is above t. Video encoder 20 may mark the block as potentially containing artifacts. In a further example, the pixel value difference check is only performed by the video encoder 20 for a subset of the partition boundaries. For example, artifacts in the luma values in the middle range [256, 384] are very visible, and some of the pixel value checks are only performed when the partition boundary falls in this range. In another example, the pixel value difference check for a pair of threshold values (x_b, x_c) is only applied by the video encoder 20 when the variance of the pixel values of the blocks does not exceed a certain threshold.

Figure 18:
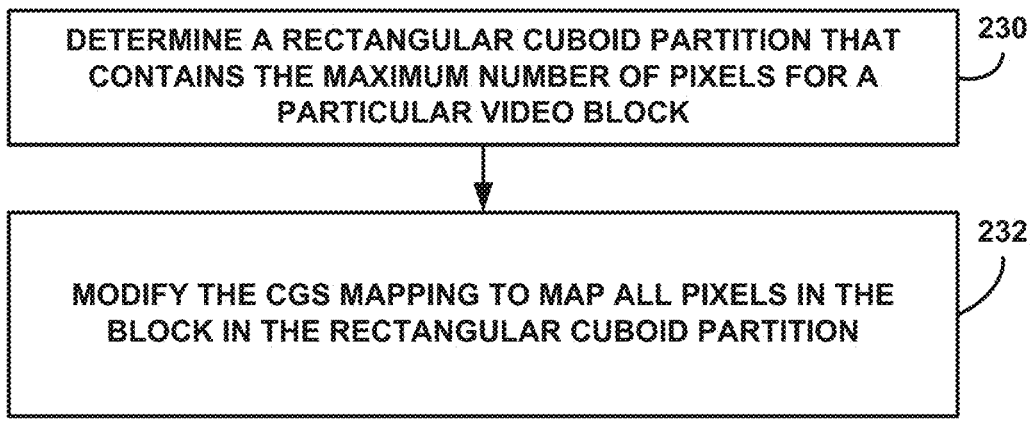
FIG. 18 is a flowchart illustrating an example operation of modifying a CGS mapping.

FIG. 18 is a flowchart illustrating an example operation of modifying a CGS mapping. The example operation of FIG. 18 is described herein as being performed by a video encoder 20 of FIG. 11.

According to the techniques of this disclosure, video encoder 20 may determine a rectangular cuboid partition that contains the maximum number of pixels for a particular video block (230). Video encoder 20 may then modify the CGS mapping to map all pixels in the block in the rectangular cuboid partition (232).

Figure 19:
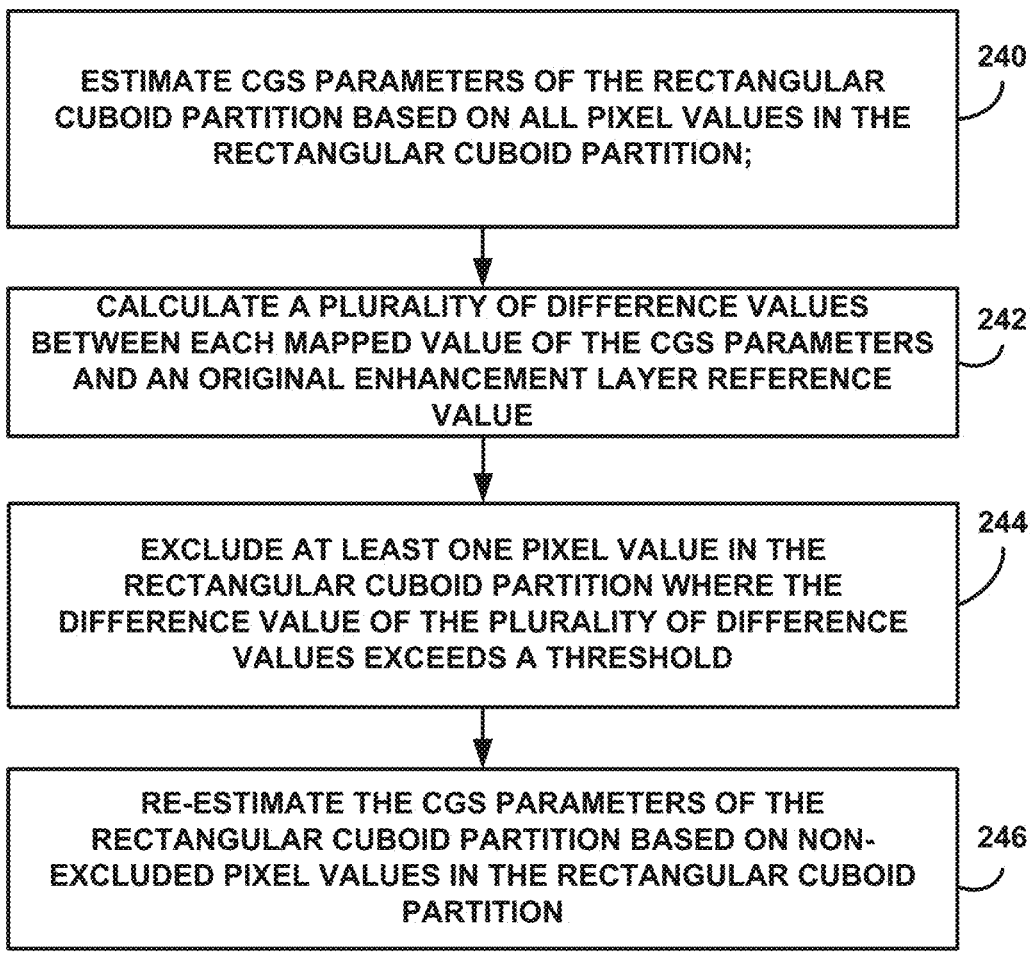
FIG. 19 is a flowchart illustrating an example operation of modifying a CGS mapping.

FIG. 19 is a flowchart illustrating an example operation of modifying a CGS mapping. The example operation of FIG. 19 is described herein as being performed by a video encoder 20 of FIG. 11.

According to the techniques of this disclosure, video encoder 20 may estimate CGS parameters of a rectangular cuboid partition based on all pixel values in the rectangular cuboid partition (240). Video encoder 20 may calculate a plurality of difference values between each mapped value of the CGS parameters and an original enhancement layer reference value (242). Video encoder 20 may exclude at least one pixel value in the rectangular cuboid partition where the difference value of the plurality of difference values exceeds a threshold (244). Video encoder 20 may re-estimate the CGS parameters of the rectangular cuboid partition based on non-excluded pixel values in the rectangular cuboid partition (246).

Figure 20:
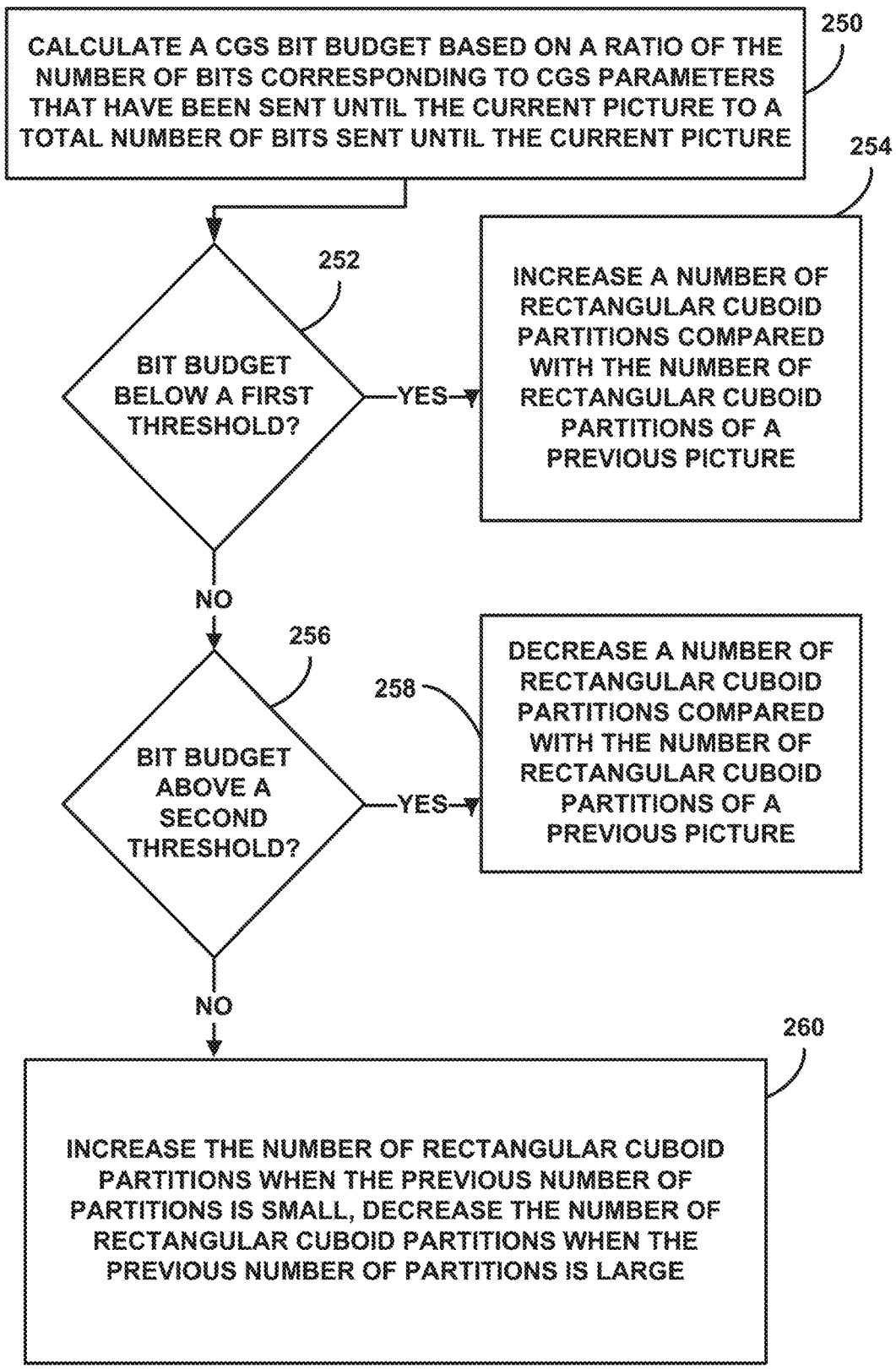
FIG. 20 is a flowchart illustrating an example operation of altering the number of CGS partitions.

FIG. 20 is a flowchart illustrating an example operation of altering the number of CGS partitions. The example operation of FIG. 20 is described herein as being performed by a video encoder 20 of FIG. 11.

According to the techniques of this disclosure, video encoder 20 may update CGS parameters aggressively in order to take advantage of better mapping functions taking into account that the bit rate does not exceed a certain value. This is because the greater the number of partitions allow the video encoder 20 a better estimate of the mapped picture. Video encoder 20 may calculate a CGS bit budget based on a ratio of the number of bits corresponding to CGS parameters that have been sent until the current picture to a total number of bits sent until the current picture (250). Video encoder 20 may determine whether a bit budget is below a first threshold (252). If yes, video encoder 20 may increase a number of rectangular cuboid partitions compared with the number of rectangular cuboid partitions of a previous picture (254). If no, video encoder 20 may determine whether the bit budget is above a second threshold (256). If yes, video encoder 20 may decrease a number of rectangular cuboid partitions compared with the number of rectangular cuboid partitions of a previous picture. If no, video encoder 20 may increase the number of rectangular cuboid partitions when the previous number of partitions is small, decrease the number of rectangular cuboid partitions when the previous number of partitions is large (260).

Similarly, video encoder 20 may apply a ruleset like the following to determine the number of partitions:

```
if( dBitCost < dBitCostT / 6.0 )
{
    if( nPartNumLog2 <= 3 )
    {
        nPartNumLog2 += 2;
    }
    else
    {
        nPartNumLog2++;
    }
}
else if( dBitCost >= dBitCostT )
{
    if( nPartNumLog2 >= 6 )
    {
        nPartNumLog2 /= 2;
    }
    else
    {
        nPartNumLog2--;
    }
}
else
{
    if( nPartNumLog2 >= 6 )
    {
        nPartNumLog2--;
    }
    else if( nPartNumLog2 <= 3 )
    {
        nPartNumLog2 ++;
    }
}
``` dBitCost=m_nAccuFrameCGSBit/m_nAccuFrameBit, where nAccuFrameCGSBit is total bits used to signal CGS parameters in the bitstream until the current picture, and nAccuFrameBit is the total number of bits signaled in the bitstream until the current picture. Therefore, dBitCost is a ratio of the number of bits used to indicate CGS parameters over the total number of bits.

dBitCostT is a threshold value used for comparing dBitCost. dBitCostT may be fixed or variable and can be set by video encoder 20.

nPartNumLog2 is variable used to derive the partitioning (i.e., the number of cuboids). Generally speaking, the greater the value of nPartNumLog2, the more the cuboids, but the number of cuboids does not monotonically increase with the values of nPartNumLog2. For example, if there are 8 partitions in the Y space, and 2 partitions each in the U and V spaces, value of nPartNumLog2 is equal to log28+log22+log22, or 3+1+1, which would be 5 partitions. Partitioning may first occur in the Y (luma) axis. Then if still permitted, by e.g., the value of nPartNumLog2, chroma axes (U and V) may be partitioned.

The foregoing code segment, when executed by e.g., video encoder 20, determines whether the number of partitions should be increased or decreased. The code segment begins by determining whether the ratio of CGS parameter bits over the total number of bits is less than ⅙ of a threshold value. If the ratio of CGS parameter bits over the total number of bits is less than ⅙ of the threshold value, and the number of partitions is less than three, add two partitions. If the ratio of CGS parameter bits over the total number of bits is less than ⅙ of the threshold value, and the number of partitions is not less than three add one partition.

If the ratio of CGS parameter bits over the total number of bits is not less than ⅙ of the threshold value, but, the ratio is greater than or equal to the threshold and the number of partitions is greater than or equal to 6, then the number of partitions is halved. If the ratio of CGS parameter bits over the total number of bits is not less than ⅙ of the threshold value, but, the ratio is greater than or equal to the threshold and the number of partitions is not greater than or equal to 6, then the number of partitions decremented.

If the ratio of CGS parameter bits over the total number of bits is not less than ⅙ of the threshold value, nor is the ratio greater than or equal to the threshold: if the number of partitions is greater than or equal to 6, decrement the number of partitions. If the number of partitions is less than or equal to 3, increment the number of partitions. In this example, the number of partitions may be replaced by a variable that is used to derive the number of partitions.

In another example, video encoder 20 may split the color space into a plurality of rectangular cuboid partitions. Video encoder 20 may calculate a CGS bit budget based, at least in part, on a ratio of a number of bits corresponding to CGS parameters that have been sent until a current picture to a total number of bits sent until the current picture. Video encoder 20 may, when the CGS bit budget is below a first threshold, increase a number of the plurality of rectangular cuboid partitions by a first value compared with a second number of rectangular cuboid partitions of a previous picture, the first value determined based on the number of plurality of rectangular cuboid partitions. Video encoder 20 may, when the CGS bit budget is above a second threshold, decrease a number of the plurality of rectangular cuboid partitions by a second value compared with a second number of rectangular cuboid partitions of a previous picture, the second value determined based on the number of plurality of rectangular cuboid partitions. Video encoder 20 may, when the CGS bit budget is above or equal to the first threshold or below or equal to the second threshold, change the number of the plurality of rectangular cuboid partitions by a third value compared with a second number of rectangular cuboid partitions of a previous picture, the third value determined based on the number of plurality of rectangular cuboid partitions.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   receiving video data comprising a plurality of video blocks, the plurality of video blocks comprising a plurality of pixel values in a color space;
   obtaining color gamut scalability (CGS) parameters comprising splitting the color space into a plurality of rectangular cuboid partitions, each of the plurality of rectangular cuboid partitions comprising at least one partition boundary between the plurality of rectangular cuboid partitions, and wherein the at least one partition boundary comprises a partition boundary of a pixel component in the color space;
   defining a first threshold value of pixel values for a first rectangular cuboid partition of the plurality of rectangular cuboid partitions adjacent to the at least one partition boundary;
   defining a second threshold value of pixel values for a second rectangular cuboid partition of the plurality of rectangular cuboid partitions different from the first rectangular cuboid partition of the plurality of rectangular cuboid partitions adjacent to the at least one partition boundary;
   identifying pixel values in the plurality of rectangular cuboid partitions that comprise characteristics that may cause the obtained CGS parameters to produce artifacts when decoding the plurality of video blocks;
   identifying blocks of the plurality of video blocks that contain the pixel values that comprise characteristics that may cause the obtained CGS parameters to produce artifacts when decoding the plurality of video blocks, wherein identifying blocks of the plurality of video blocks that contain the pixel values that may cause the obtained CGS parameters to produce artifacts when decoding the plurality of video blocks comprises:
      collecting all pixel values between the first threshold value of pixel values for the first rectangular cuboid partition of the plurality of rectangular cuboid partitions and the at least one partition boundary, and
      collecting all pixel values between the second threshold value of pixel values for the second rectangular cuboid partition of the plurality of rectangular cuboid partitions and the at least one partition boundary;
   disabling an inter-layer prediction mode for the identified blocks; and
   encoding the plurality of video blocks using a scalable video coding process with the obtained CGS parameters.

2. The method of claim 1, wherein the plurality of video blocks comprises a coding unit or a prediction unit.

3. The method of claim 1, wherein the pixel component comprises a luma component of the color space.

4. The method of claim 1, wherein identifying pixel values in the rectangular cuboid partitions that may cause the obtained CGS parameters to produce artifacts when decoding the plurality of video blocks comprises collecting all pixel values that fall within a threshold value of pixel values for a first partition boundary into a first list of pixel values and a second partition boundary into a second list of pixel values.

5. The method of claim 1, wherein the CGS parameters comprises a CGS map corresponding to the rectangular cuboid partition of the plurality of rectangular cuboid partitions that comprises a maximum number of pixels in a first video block of the plurality of video blocks used to map all pixels in the first video block.

6. The method of claim 1 wherein obtaining CGS parameters further comprises:
   estimating CGS parameters of a rectangular cuboid partition of the plurality of rectangular cuboid partitions based on all pixel values in the rectangular cuboid partition;
   calculating a plurality of difference values between each mapped value of the CGS parameters and an original enhancement layer reference value;
   excluding at least one pixel value of the all pixel values in the rectangular cuboid partition where the difference value of the plurality of difference values exceeds a threshold; and
   re-estimating the CGS parameters of the rectangular cuboid partition based on non-excluded pixel values in the rectangular cuboid partition.

7. The method of claim 1, wherein splitting the color space into a plurality of rectangular cuboid partitions comprises:
   calculating a CGS bit budget based, at least in part, on a ratio of a number of bits corresponding to CGS parameters that have been sent until a current picture to a total number of bits sent until the current picture;
   when the CGS bit budget is below a first threshold, increasing a number of the plurality of rectangular cuboid partitions by a first value compared with a second number of rectangular cuboid partitions of a previous picture, the first value determined based on the number of plurality of rectangular cuboid partitions;
   when the CGS bit budget is above a second threshold, decreasing a number of the plurality of rectangular cuboid partitions by a second value compared with a second number of rectangular cuboid partitions of a previous picture, the second value determined based on the number of plurality of rectangular cuboid partitions; and
   when the CGS bit budget is above or equal to the first threshold or below or equal to the second threshold, changing the number of the plurality of rectangular cuboid partitions by a third value compared with a second number of rectangular cuboid partitions of a previous picture, the third value determined based on the number of plurality of rectangular cuboid partitions.

8. The method of claim 1, wherein the color space comprises a YUV or $YC_BC_R$ color space.

9. The method of claim 1, further comprising:
defining a third threshold value of pixel values for the at least one partition boundary,
wherein identifying blocks of the plurality of video blocks that contain the pixel values that may cause the obtained CGS parameters to produce artifacts when decoding the plurality of video blocks comprises collecting all pixel values that fall within the third threshold value of pixel values for a rectangular cuboid partition of the plurality of rectangular cuboid partitions adjacent to the at least one partition boundary into a list of pixel values.

10. The method of claim 1, wherein:
obtaining color gamut scalability (CGS) parameters further comprises:
generating a three dimensional lookup table based on the plurality of rectangular cuboid partitions for each color component, and
minimizing a mean squared value between pixels belonging to each of the plurality of rectangular cuboid partitions, and
encoding the plurality of video blocks further comprises:
for each of the plurality of rectangular cuboid partitions, encoding CGS parameters for linear color mapping function of color values in the three dimensional lookup table.

11. A device for processing data, the device comprising:
a memory configured to store video data; and
one or more processors in communication with the memory and configured to:
receive the video data comprising a plurality of video blocks, the plurality of video blocks comprising a plurality of pixel values in a color space;
obtain color gamut scalability (CGS) parameters via a split of the color space into a plurality of rectangular cuboid partitions, each of the plurality of rectangular cuboid partitions comprising at least one partition boundary between the plurality of rectangular cuboid partitions, and wherein the at least one partition boundary comprises a partition boundary of a pixel component in the color space;
define a first threshold value of pixel values for a first rectangular cuboid partition of the plurality of rectangular cuboid partitions adjacent to the at least one partition boundary;
define a second threshold value of pixel values for a second rectangular cuboid partition of the plurality of rectangular cuboid partitions different from the first rectangular cuboid partition of the plurality of rectangular cuboid partitions adjacent to the at least one partition boundary;
identify pixel values in the rectangular cuboid partitions that comprise characteristics that may cause the obtained CGS parameters to produce artifacts when decoding the plurality of video blocks;
identify blocks of the plurality of video blocks that contain the pixel values that may cause the obtained CGS parameters to produce artifacts when decoding the plurality of video blocks, wherein to identify blocks of the plurality of video blocks that contain the pixel values that may cause the obtained CGS parameters to produce artifacts when decoding the plurality of video blocks, the one or more processors are further configured to:
collect all pixel values between the first threshold value of pixel values for the first rectangular cuboid partition of the plurality of rectangular cuboid partitions and the at least one partition boundary, and
collect all pixel values between the second threshold value of pixel values for the second rectangular cuboid partition of the plurality of rectangular cuboid partitions and the at least one partition boundary;
disable an inter-layer prediction mode for the identified blocks; and
encode the plurality of video blocks using a scalable video coding process with the obtained CGS parameters.

12. The device of claim 11, wherein the pixel component comprises a luma component of the color space.

13. The device of claim 11, wherein the CGS parameters comprises a CGS map corresponding to the rectangular cuboid partition of the plurality of rectangular cuboid partitions that comprises a maximum number of pixels in a first video block of the plurality of video blocks used to map all pixels in the first video block.

14. The device of claim 11, wherein the one or more processors are further configured to:
estimate CGS parameters of a rectangular cuboid partition of the plurality of rectangular cuboid partitions based on all pixel values in the rectangular cuboid partition;
calculate a plurality of difference values between each mapped value of the CGS parameters and an original enhancement layer reference value;
exclude at least one pixel value of the all pixel values in the rectangular cuboid partition where the difference value of the plurality of difference values exceeds a threshold; and
re-estimate the CGS parameters of the rectangular cuboid partition based on non-excluded pixel values in the rectangular cuboid partition.

15. The device of claim 11, wherein the one or more processors are further configured to:
calculate a CGS bit budget based, at least in part, on a ratio of a number of bits corresponding to CGS parameters that have been sent until a current picture to a total number of bits sent until the current picture;
when the CGS bit budget is below a first threshold, increase a number of the plurality of rectangular cuboid partitions by a first value compared with a second number of rectangular cuboid partitions of a previous picture, the first value determined based on the number of plurality of rectangular cuboid partitions;
when the CGS bit budget is above a second threshold, decrease a number of the plurality of rectangular cuboid partitions by a second value compared with a second number of rectangular cuboid partitions of a previous picture, the second value determined based on the number of plurality of rectangular cuboid partitions; and
when the CGS bit budget is above or equal to the first threshold or below or equal to the second threshold, change the number of the plurality of rectangular cuboid partitions by a third value compared with a second number of rectangular cuboid partitions of a previous picture, the third value determined based on the number of plurality of rectangular cuboid partitions.

16. The device of claim 11, wherein the one or more processor are further configured to:

define a third threshold value of pixel values for the at least one partition boundary; and collect all pixel values that fall within the third threshold value of pixel values for a rectangular cuboid partition of the plurality of rectangular cuboid partitions adjacent to the at least one partition boundary into a list of pixel values.

17. The device of claim 11, wherein the one or more processors are further configured to:

generate a three dimensional lookup table based on the plurality of rectangular cuboid partitions for each color component;

minimize of a mean squared value between pixels belonging to each of the plurality of rectangular cuboid partitions; and encode CGS parameters for linear color mapping function of color values in the three dimensional lookup table.

18. A device for encoding video data, the device comprising:

means for receiving video data comprising a plurality of video blocks, the plurality of video blocks comprising a plurality of pixel values in a color space;

means for obtaining color gamut scalability (CGS) parameters comprising splitting the color space into a plurality of rectangular cuboid partitions, each of the plurality of rectangular cuboid partitions comprising at least one partition boundary between the plurality of rectangular cuboid partitions, and wherein the at least one partition boundary comprises a partition boundary of a pixel component in the color space;

means for defining a first threshold value of pixel values for a first rectangular cuboid partition of the plurality of rectangular cuboid partitions adjacent to the at least one partition boundary;

means for defining a second threshold value of pixel values for a second rectangular cuboid partition of the plurality of rectangular cuboid partitions different from the first rectangular cuboid partition of the plurality of rectangular cuboid partitions adjacent to the at least one partition boundary;

means for identifying pixel values in the rectangular cuboid partitions that comprise characteristics that may cause the obtained CGS parameters to produce artifacts when decoding the plurality of video blocks;

means for identifying blocks of the plurality of video blocks that contain the pixel values that may cause the obtained CGS parameters to produce artifacts when decoding the plurality of video blocks, wherein the means for identifying blocks of the plurality of video blocks that contain the pixel values that may cause the obtained CGS parameters to produce artifacts when decoding the plurality of video blocks comprises:

means for collecting all pixel values between the first threshold value of pixel values for the first rectangular cuboid partition of the plurality of rectangular cuboid partitions and the at least one partition boundary, and means for collecting all pixel values between the second threshold value of pixel values for the second rectangular cuboid partition of the plurality of rectangular cuboid partitions and the at least one partition boundary;

means for disabling an inter-layer prediction mode for the identified blocks; and means for encoding the plurality of video blocks using a scalable video coding process with the obtained CGS parameters.

19. A non-transitory computer-readable storage medium including instructions stored thereon that, when executed, cause at least one processor of to:

receive video data comprising a plurality of video blocks, the plurality of video blocks comprising a plurality of pixel values in a color space;

obtain color gamut scalability (CGS) parameters via a split of the color space into a plurality of rectangular cuboid partitions, each of the plurality of rectangular cuboid partitions comprising at least one partition boundary between the plurality of rectangular cuboid partitions, and wherein the at least one partition boundary comprises a partition boundary of a pixel component in the color space;

define a first threshold value of pixel values for a first rectangular cuboid partition of the plurality of rectangular cuboid partitions adjacent to the at least one partition boundary;

define a second threshold value of pixel values for a second rectangular cuboid partition of the plurality of rectangular cuboid partitions different from the first rectangular cuboid partition of the plurality of rectangular cuboid partitions adjacent to the at least one partition boundary;

identify pixel values in the rectangular cuboid partitions that comprise characteristics that may cause the obtained CGS parameters to produce artifacts when decoding the plurality of video blocks;

identify blocks of the plurality of video blocks that contain the pixel values that may cause the obtained CGS parameters to produce artifacts when decoding the plurality of video blocks, wherein to identify blocks of the plurality of video blocks that contain the pixel values that may cause the obtained CGS parameters to produce artifacts when decoding the plurality of video blocks, the instructions further cause the at least one processor to:

collect all pixel values between the first threshold value of pixel values for the first rectangular cuboid partition of the plurality of rectangular cuboid partitions and the at least one partition boundary, and collect all pixel values between the second threshold value of pixel values for the second rectangular cuboid partition of the plurality of rectangular cuboid partitions and the at least one partition boundary;

disable an inter-layer prediction mode for the identified blocks; and encode the plurality of video blocks using a scalable video coding process with the obtained CGS parameters.

* * * * *